United States Patent
Sarkar et al.

(10) Patent No.: US 11,087,424 B1
(45) Date of Patent: Aug. 10, 2021

(54) IMAGE RECOGNITION-BASED CONTENT ITEM SELECTION

(71) Applicant: GOOGLE LLC, Mountain View, CA (US)

(72) Inventors: Subhadip Sarkar, Sunnyvale, CA (US); Ravi Jain, Palo Alto, CA (US); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 178 days.

(21) Appl. No.: 15/638,324

(22) Filed: Jun. 29, 2017

Related U.S. Application Data

(63) Continuation-in-part of application No. 14/190,523, filed on Feb. 26, 2014, now abandoned, which is a
(Continued)

(51) Int. Cl.
*G06Q 30/00* (2012.01)
*G06Q 90/00* (2006.01)
*G06Q 30/02* (2012.01)

(52) U.S. Cl.
CPC .......... *G06Q 90/00* (2013.01); *G06Q 30/0256* (2013.01)

(58) Field of Classification Search
CPC ........... G06Q 30/0251; G06Q 30/0256; G06Q 30/0257; G06F 16/242; G06F 16/5866; G06F 16/95356; G06K 9/6267
(Continued)

(56) References Cited

U.S. PATENT DOCUMENTS

| 5,418,713 A | 5/1995 | Allen |
| 5,498,002 A | 3/1996 | Gechter |

(Continued)

FOREIGN PATENT DOCUMENTS

| EP | 0 408 348 A2 | 1/1991 |
| JP | 2007-072712 A | 3/2007 |

(Continued)

OTHER PUBLICATIONS

Rubinstein, Daniel & Sluis, Katrina, A Life More Photographic; Mapping the networked image, Routledge Taylor & Francis Group, Photographies, vol. 1, No. 1, Mar. 2008, pp. 9-28, downloaded from https://www.researchgate.net/publication/299854265_A_Life_More_Photographic_Mapping_The_Networked_Image (Year: 2008).*
(Continued)

*Primary Examiner* — Scott D Gartland
(74) *Attorney, Agent, or Firm* — Foley & Lardner LLP

(57) ABSTRACT

Systems and methods of selecting content based on image data are provided. A system can receive an image captured by a camera of the computing device. The system can analyze the image to identify a pattern that matches a predetermined pattern of an object stored in an image pattern database comprising a plurality of predetermined patterns of objects. The system can identify one or more image keywords from the image based on the predetermined pattern of the object that matches the image. The system can select, based on a comparison of the one or more image keywords with one or more keywords of each of a plurality of content items, a content item. The system can provide, to the computing device, the content item to cause the computing device to present the content item.

20 Claims, 8 Drawing Sheets

Related U.S. Application Data continuation of application No. 13/168,904, filed on Jun. 24, 2011, now Pat. No. 8,688,514, application No. 15/638,324, which is a continuation-in-part of application No. 15/395,689, filed on Dec. 30, 2016, now Pat. No. 10,972,530.

(58) Field of Classification Search
USPC .............................. 705/14.49, 14.55, 14.56
See application file for complete search history.

(56) References Cited

U.S. PATENT DOCUMENTS

| | | | |
|---|---|---|---|
| 5,572,643 | A | 11/1996 | Judson |
| 5,602,565 | A | 2/1997 | Takeuchi |
| 5,634,850 | A | 6/1997 | Kitahara et al. |
| 5,682,511 | A | 10/1997 | Sposato et al. |
| 5,748,173 | A | 5/1998 | Gur |
| 5,774,664 | A | 6/1998 | Hidary et al. |
| 5,778,181 | A | 7/1998 | Hidary et al. |
| 5,831,591 | A | 11/1998 | Suh |
| 5,845,263 | A | 12/1998 | Camaisa et al. |
| 5,856,821 | A | 1/1999 | Funahashi |
| 6,011,537 | A | 1/2000 | Slotznick |
| 6,018,768 | A | 1/2000 | Ullman et al. |
| 6,026,373 | A | 2/2000 | Goodwin, III |
| 6,185,558 | B1 | 2/2001 | Bowman et al. |
| 6,199,060 | B1 | 3/2001 | Gustman |
| 6,275,806 | B1 | 8/2001 | Pertrushin |
| 6,320,602 | B1 | 11/2001 | Burkardt et al. |
| 6,505,169 | B1 | 1/2003 | Bhagavath et al. |
| 6,510,553 | B1 | 1/2003 | Hazra |
| 6,570,587 | B1 | 5/2003 | Efrat et al. |
| 6,591,247 | B2 | 7/2003 | Stern |
| 6,642,940 | B1 | 11/2003 | Dakss et al. |
| 6,684,249 | B1 | 1/2004 | Frerichs et al. |
| 6,823,495 | B1 | 11/2004 | Vedula et al. |
| 6,857,007 | B1 | 2/2005 | Bloomfield |
| 6,947,531 | B1 * | 9/2005 | Lewis ................ G06Q 30/0207 |
| | | | 379/114.13 |
| 7,124,101 | B1 | 10/2006 | Mikurak |
| 7,158,676 | B1 | 1/2007 | Rainsford |
| 7,302,254 | B2 * | 11/2007 | Valloppillil ............. H04L 67/04 |
| | | | 455/414.1 |
| 7,526,786 | B1 | 4/2009 | Adams et al. |
| 7,647,242 | B2 | 1/2010 | Bem |
| 7,660,815 | B1 | 2/2010 | Scofield et al. |
| 7,668,821 | B1 | 2/2010 | Donsbach et al. |
| 7,831,472 | B2 | 11/2010 | Yufik |
| 7,853,255 | B2 | 12/2010 | Karaoguz et al. |
| 7,979,459 | B2 | 7/2011 | Wu et al. |
| 8,065,611 | B1 | 11/2011 | Chan et al. |
| 8,073,868 | B2 | 12/2011 | Lavi |
| 8,090,222 | B1 | 1/2012 | Baluja et al. |
| 8,108,253 | B2 | 1/2012 | Poon et al. |
| 8,126,766 | B2 | 2/2012 | Alexander |
| 8,135,619 | B2 | 3/2012 | Bem |
| 8,195,133 | B2 | 6/2012 | Ramer et al. |
| 8,301,499 | B2 | 10/2012 | Moissinac et al. |
| 8,386,386 | B1 | 2/2013 | Zhu |
| 8,391,618 | B1 | 3/2013 | Chuang et al. |
| 8,463,783 | B1 | 6/2013 | Yagnik |
| 8,583,471 | B1 * | 11/2013 | Voskuhl ............. G06Q 30/0254 |
| | | | 705/7.33 |
| 8,688,514 | B1 | 4/2014 | Sarkar et al. |
| 8,903,716 | B2 | 12/2014 | Chen et al. |
| 9,189,514 | B1 | 11/2015 | Myslinski |
| 9,304,738 | B1 | 4/2016 | Xu et al. |
| 9,535,887 | B2 | 1/2017 | Ozgul |
| 9,875,740 | B1 | 1/2018 | Kumar et al. |
| 9,959,129 | B2 | 5/2018 | Kannan et al. |
| 10,056,078 | B1 | 8/2018 | Shepherd et al. |
| 10,068,573 | B1 | 9/2018 | Aykac et al. |
| 10,276,170 | B2 | 4/2019 | Gruber et al. |
| 10,417,037 | B2 | 9/2019 | Gruber et al. |
| 10,565,256 | B2 | 2/2020 | Badr et al. |
| 2001/0045948 | A1 | 11/2001 | Shiiyama |
| 2002/0032603 | A1 | 3/2002 | Yeiser |
| 2002/0045988 | A1 * | 4/2002 | Yokota .................. G01C 21/20 |
| | | | 701/484 |
| 2002/0053078 | A1 | 5/2002 | Holtz et al. |
| 2002/0065722 | A1 | 5/2002 | Hubbard et al. |
| 2002/0133571 | A1 | 9/2002 | Jacob et al. |
| 2003/0018541 | A1 | 1/2003 | Nohr |
| 2003/0028873 | A1 | 2/2003 | Lemmons |
| 2003/0033161 | A1 | 2/2003 | Walker et al. |
| 2003/0040957 | A1 | 2/2003 | Rodriguez et al. |
| 2003/0074662 | A1 | 4/2003 | Istvan et al. |
| 2003/0187844 | A1 | 10/2003 | Li et al. |
| 2004/0044569 | A1 | 3/2004 | Roberts et al. |
| 2004/0260621 | A1 | 12/2004 | Foster et al. |
| 2005/0125683 | A1 | 6/2005 | Matsuyama et al. |
| 2005/0138016 | A1 | 6/2005 | Matsuyama et al. |
| 2005/0187823 | A1 | 8/2005 | Howes |
| 2005/0188400 | A1 | 8/2005 | Topel |
| 2005/0220439 | A1 | 10/2005 | Carton et al. |
| 2005/0261968 | A1 | 11/2005 | Randall et al. |
| 2005/0288096 | A1 | 12/2005 | Walker et al. |
| 2006/0004627 | A1 | 1/2006 | Baluja |
| 2006/0064411 | A1 | 3/2006 | Gross et al. |
| 2006/0247999 | A1 | 11/2006 | Gonen et al. |
| 2006/0293995 | A1 | 12/2006 | Borgs et al. |
| 2007/0094042 | A1 | 4/2007 | Ramer et al. |
| 2007/0094081 | A1 | 4/2007 | Yruski et al. |
| 2007/0097975 | A1 | 5/2007 | Rakers et al. |
| 2007/0123222 | A1 | 5/2007 | Cox et al. |
| 2007/0127688 | A1 | 6/2007 | Doulton |
| 2007/0174258 | A1 | 7/2007 | Jones et al. |
| 2007/0288309 | A1 | 12/2007 | Haberman et al. |
| 2008/0021953 | A1 * | 1/2008 | Gil .......................... G06F 16/955 |
| | | | 709/203 |
| 2008/0060001 | A1 | 3/2008 | Logan et al. |
| 2008/0066107 | A1 | 3/2008 | Moonka et al. |
| 2008/0086368 | A1 | 4/2008 | Bauman et al. |
| 2008/0091537 | A1 | 4/2008 | Miller et al. |
| 2008/0107404 | A1 | 5/2008 | Nakamura et al. |
| 2008/0109306 | A1 | 5/2008 | Maigret et al. |
| 2008/0120276 | A1 * | 5/2008 | Chennavasin ...... G06F 16/3338 |
| 2008/0172422 | A1 | 7/2008 | Li et al. |
| 2008/0187279 | A1 | 8/2008 | Gilley et al. |
| 2008/0201220 | A1 * | 8/2008 | Broder .................. G06Q 30/02 |
| | | | 705/14.56 |
| 2008/0222132 | A1 | 9/2008 | Pan et al. |
| 2008/0235087 | A1 | 9/2008 | Amento et al. |
| 2008/0243821 | A1 | 10/2008 | Delli Santi et al. |
| 2008/0263583 | A1 | 10/2008 | Heath |
| 2008/0268876 | A1 * | 10/2008 | Gelfand ................ G06Q 30/02 |
| | | | 455/457 |
| 2008/0270538 | A1 | 10/2008 | Garg et al. |
| 2008/0281684 | A1 * | 11/2008 | Stefanik ............. G06Q 30/0234 |
| | | | 705/14.34 |
| 2008/0319844 | A1 | 12/2008 | Hua et al. |
| 2009/0163227 | A1 | 6/2009 | Collins |
| 2009/0179900 | A1 | 7/2009 | Petrovic et al. |
| 2009/0254971 | A1 | 10/2009 | Herz et al. |
| 2009/0265236 | A1 | 10/2009 | Schultz et al. |
| 2009/0307013 | A1 | 12/2009 | Altounian et al. |
| 2009/0324107 | A1 | 12/2009 | Walch |
| 2010/0094686 | A1 | 4/2010 | Henshaw et al. |
| 2010/0104145 | A1 | 4/2010 | Momosaki |
| 2010/0111196 | A1 | 5/2010 | Lynch et al. |
| 2010/0287056 | A1 | 11/2010 | Koningstein et al. |
| 2010/0290699 | A1 | 11/2010 | Adam et al. |
| 2011/0161130 | A1 | 6/2011 | Whalin et al. |
| 2011/0208822 | A1 | 8/2011 | Rathod |
| 2011/0238500 | A1 | 9/2011 | Kim |
| 2011/0246027 | A1 | 10/2011 | Miyajima |
| 2011/0246285 | A1 | 10/2011 | Ratnaparkhi et al. |
| 2011/0295847 | A1 | 12/2011 | Cucerzan et al. |
| 2012/0054015 | A1 | 3/2012 | Wu |
| 2012/0059713 | A1 | 3/2012 | Galas et al. |
| 2012/0072280 | A1 | 3/2012 | Lin |
| 2012/0095828 | A1 | 4/2012 | Evankovich et al. |
| 2012/0105868 | A1 | 5/2012 | Nomura et al. |

(56) References Cited

U.S. PATENT DOCUMENTS

| | | | |
|---|---|---|---|
| 2012/0150657 A1 | 6/2012 | Rubinstein et al. | |
| 2012/0159620 A1 | 6/2012 | Seifert et al. | |
| 2012/0224768 A1* | 9/2012 | Lee | G06F 16/5838 382/165 |
| 2012/0265528 A1 | 10/2012 | Gruber et al. | |
| 2012/0265761 A1 | 10/2012 | Atsmon et al. | |
| 2012/0290566 A1 | 11/2012 | Dasher et al. | |
| 2012/0294520 A1 | 11/2012 | Mei et al. | |
| 2013/0091453 A1 | 4/2013 | Kotler et al. | |
| 2013/0117022 A1 | 5/2013 | Chen et al. | |
| 2013/0120544 A1 | 5/2013 | Du et al. | |
| 2013/0268507 A1 | 10/2013 | Macbeth et al. | |
| 2013/0272570 A1 | 10/2013 | Sheng et al. | |
| 2013/0275164 A1 | 10/2013 | Gruber et al. | |
| 2013/0290172 A1* | 10/2013 | Mashinsky | G06Q 20/12 705/39 |
| 2013/0304758 A1 | 11/2013 | Gruber et al. | |
| 2013/0318089 A1 | 11/2013 | Tan et al. | |
| 2014/0222436 A1 | 8/2014 | Binder et al. | |
| 2014/0278411 A1 | 9/2014 | Cheung | |
| 2014/0278528 A1 | 9/2014 | Simha et al. | |
| 2014/0280015 A1 | 9/2014 | Marantz et al. | |
| 2014/0324851 A1 | 10/2014 | Tholiya et al. | |
| 2014/0351241 A1 | 11/2014 | Leask et al. | |
| 2014/0351261 A1 | 11/2014 | Aswani et al. | |
| 2015/0161147 A1 | 6/2015 | Zhao et al. | |
| 2015/0199731 A1 | 7/2015 | Jevtic et al. | |
| 2015/0227504 A1 | 8/2015 | Zhang et al. | |
| 2015/0256633 A1 | 9/2015 | Chand et al. | |
| 2015/0278878 A1 | 10/2015 | Chau | |
| 2015/0370914 A1 | 12/2015 | Carroll et al. | |
| 2016/0063106 A1 | 3/2016 | Chai et al. | |
| 2016/0104212 A1 | 4/2016 | Saligrama Ananthanarayana et al. | |
| 2016/0210689 A1 | 7/2016 | Hummel | |
| 2016/0212455 A1 | 7/2016 | Manna | |
| 2016/0315995 A1 | 10/2016 | Hausler et al. | |
| 2017/0024766 A1 | 1/2017 | Thomson et al. | |
| 2017/0061515 A1 | 3/2017 | Hummel | |
| 2017/0076316 A1 | 3/2017 | Heffernan et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0178686 A1 | 6/2017 | Li et al. | |
| 2017/0323230 A1 | 11/2017 | Bailey et al. | |
| 2017/0358301 A1 | 12/2017 | Raitio et al. | |
| 2018/0040020 A1 | 2/2018 | Kurian et al. | |
| 2018/0097940 A1 | 4/2018 | Beilis et al. | |
| 2018/0277113 A1 | 9/2018 | Hartung et al. | |
| 2018/0300745 A1 | 10/2018 | Aubespin et al. | |

FOREIGN PATENT DOCUMENTS

| | | |
|---|---|---|
| JP | 2009-048446 A | 3/2009 |
| JP | 2015-528140 | 9/2015 |
| KR | 10-2000-0017807 A | 4/2000 |
| WO | WO-02/37470 | 5/2002 |
| WO | WO-02/080555 A2 | 10/2002 |
| WO | WO-2011/088053 A2 | 7/2011 |
| WO | WO-2018/125299 A1 | 7/2018 |

OTHER PUBLICATIONS

Yardi, Sarita, et al., Photo-Based Authentication Using Social Networks, WOSN '08 (Workshop on Online Social Networks), Aug. 18, 2008, downloaded from http://conferences.sigcomm.org/sigcomm/2008/workshops/wosn/papers/p55.pdf on Jun. 7, 2021 (Year: 2008).*

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Barr, "AWS DeepLens—Get Hands-On Experience with Deep Learning With Our New Video Camera", AWS News Blog, Nov. 29, 2017, 11 pages.

Buckland et al., "Amazon's Alexa Takes Open-Source Route to Beat Google Into Cars", Bloomberg, Feb. 27, 2018, 6 pages.

Coberly, "Apple patent filing reveals potential whispering Siri functionality", Techspot, Dec. 14, 2017, 4 pages.

Estes, "Amazon's Newest Gadget Is a Tablet That's Also an Echo", Gizmodo, Sep. 19, 2017, 3 pages.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

Heater, "Amazon Alexa devices can finally tell voices apart", TechCrunch, Oct. 11, 2017, 6 pages.

International Search Report and Written Opinion for PCT Appl. Ser. No. PCT/US2017/049713 dated Oct. 25, 2017, 12 pages.

Johnston, "Amazon Whirlwind: New Echo, Plus, Spot, Connect, Fire TV Take the Stage", Twice, Sep. 27, 2017, 4 pages.

Kelion, "Amazon revamps Echo smart speaker family", BBC News, Sep. 27, 2017, 11 pages.

Krishna, "Jim Beam's smart decanter will pour you a shot when you ask", engadget, Nov. 29, 2017, 3 pages.

Lacy, "Improving search and advertising are the next frontiers for voice-activated devices", TechCrunch, Dec. 20, 2017, 13 pages.

Lee, Take Two for Samsung's troubled Bixby assistant, BBC News, Oct. 19, 2017, 6 pages.

Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.

Novet, et al., "Amazon is getting ready to bring Alexa to work", CNBC, Nov. 29, 2017, 4 pages.

Palladino, "Garmin teamed up with Amazon to make a tiny Echo Dot for your car", ars Technica, Oct. 17, 2017, 2 pages.

Perez, "Alexa's 'Routines' will combine smart home control with other actions, like delivering your news and weather", TechCrunch, Sep. 28, 2017, 10 pages.

Pringle, "'I'm sorry to hear that': Why training Siri to be a therapist won't be easy", CBC News, Sep. 24, 2017, 3 pages.

Unknown Author, "'Dolphin' attacks fool Amazon, Google voice assistants", BBC News, Sep. 7, 2017, 8 pages.

U.S. Notice of Allowance on U.S. Appl. No. 13/932,836 dated Dec. 18, 2017, 7 pages.

U.S. Notice of Allowance on U.S. Appl. No. 15/584,940 dated Feb. 26, 2018, 9 pages.

U.S. Notice of Allowance on U.S. Appl. No. 15/584,940 dated Jan. 30, 2018, 9 pages.

U.S. Office Action on U.S. Appl. No. 15/190,897 dated Dec. 7, 2017, 34 pages.

"Amazon and Google Want to Turn Their Smart Home Speakers Into Telephone Replacements—Mac Rumors" MacRumors, 9 pages.

"Apple Patent Reveals a New Security Feature Coming to Siri" 6 pages.

"Introducing Echo Look Hands-Free Camera and Style Assistant" 1996-2017, Amazon.com, Inc. 5 pages.

"The Patent Behind Google Home's New Feature of Understanding Different Voices in the Home Surfaced Today", Apr. 20, 2017, 5 pages.

Broussard, Mitchel, "Chatbot-Like Siri Patent Includes Intelligent Image, Video, and Audio Recognition Within Messages", MacRumors, May 11, 2017, 11 pages.

Chen, Yilun Lulu, "Alibaba Challenges Google, Amazon With New Echo-Like Device", Bloomberg, Jul. 5, 2017, 3 pages.

(56) References Cited

OTHER PUBLICATIONS

Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Golgowski, Nina, "This Burger King Ad Is Trying to Control Your Google Home Device", Apr. 12, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Koetsier, John, "Ads on Amazon Echo: Wendy's, ESPN, and Progressive Among Brands Testing", Forbes, May 11, 2017, 3 pages.
Larson, Selena "Google Home Now Recognizes your Individual Voice" dated Apr. 20, 2017, 3 pages.
Lee, Dave, "The five big announcements from Google I/O", BBC, May 18, 2017, 11 pages.
Lund, Pamela, Mastering Google Product Feeds and Product Listing Ads—Part 1, found at http://www.blueglass.com/blog/mastering-google-product-feeds-and-product-listing-ads-part-1/#comments, 17 pages.
Nieva, Richard, "Google Home and eBay can tell you how much that's worth", 3 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, dated May 31, 2017, 6 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges At Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
U.S. Notice of Allowance and Fees Due on U.S. Appl. No. 13/168,904 dated Jan. 10, 2014.
U.S. Notice of Allowance on U.S. Appl. No. 14/278,473 dated Oct. 31, 2016.
U.S. Office Action for U.S. Appl. No. 13/295,507 dated May 10, 2013.
U.S. Office Action for U.S. Appl. No. 13/295,507 dated Oct. 30, 2013.
U.S. Office Action on U.S. Appl. No. 13/168,904 dated Aug. 7, 2013.
U.S. Office Action on U.S. Appl. No. 13/295,507 dated Jul. 23, 2015.
U.S. Office Action on U.S. Appl. No. 13/295,507 dated Mar. 24, 2016.
U.S. Office Action on U.S. Appl. No. 13/932,836 dated Feb. 12, 2015.
U.S. Office Action on U.S. Appl. No. 13/932,836 dated Jun. 24, 2015.
U.S. Office Action on U.S. Appl. No. 13/932,836 dated Apr. 12, 2017.
U.S. Office Action on U.S. Appl. No. 13/932,836 dated Jul. 8, 2016.
U.S. Office Action on U.S. Appl. No. 13/932,836 dated Nov. 16, 2015.
U.S. Office Action on U.S. Appl. No. 13/932,836 dated Nov. 2, 2016.
U.S. Office Action on U.S. Appl. No. 14/190,523 dated May 20, 2016.
U.S. Office Action on U.S. Appl. No. 14/190,523 dated Aug. 21, 2014.
U.S. Office Action on U.S. Appl. No. 14/190,523 dated Dec. 3, 2014.
U.S. Office Action on U.S. Appl. No. 14/190,523 dated Apr. 2, 2015.
U.S. Office Action on U.S. Appl. No. 14/190,523 dated Jun. 6, 2016.
U.S. Office Action on U.S. Appl. No. 14/190,523 dated Aug. 17, 2015.
U.S. Office Action on U.S. Appl. No. 14/190,523 dated Feb. 22, 2017.
U.S. Office Action on U.S. Appl. No. 14/190,523 dated May 26, 2015.
U.S. Office Action on U.S. Appl. No. 14/190,523 dated Nov. 25, 2015.
U.S. Office Action on U.S. Appl. No. 14/278,473 dated May 3, 2016.
U.S. Office Action on U.S. Appl. No. 14/278,473 dated Sep. 23, 2016.
Willens, Max, "For publishers, Amazon Alexa holds promise but not much money (yet)", Digiday, Jul. 6, 2017, 5 pages.
"CrunchBase ScanScout," [online] [Retrieved on Mar. 11, 2011]; Retrieved from the Internet URL: http://www.crunchbase.com/company/ScanScout; 3 pages.
"Introducing Adap.tv for Advertisers," [online][Retrieved on Mar. 11, 2011]; Retrieved from the internet URL: http://www.adap.tv/demo.html; 1 page.
"MeToday Jul. 4, 2007," [online] [Retrieved on Mar. 11, 2011]; Retrieved from the Internet, URL: http://www.viddler.com/explore/djsteen/videos/27/; 1 page.
"Ooyala Blog: Create the Group," [online][Retrieved on Mar. 11, 2011]; Retrieved from the Internet URL: http//www.ooyala.com/blog; 11 pages.
"Walmart and Google to offer voice-enabled shopping", BBC News, Aug. 23, 2017.
"What's Hot on Shopping.com," [online][Retrieved on Mar. 11, 2011]; Retrieved from the Internet URL; shopping.com; 2 pages.
Anonymous, "Microsoft for Digital Advertising Industry", PR Newswire, New York, Jan. 13, 2006, pp. 1-4. ProQuest Document ID 968489271.
Arrington, Michael, "Hulu Makes First Acquisition; Chinese Video Startup to Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.
Arrington, Michael, "TechCrunch—AdBrite Makes Brilliant Video Product," [online][Retrieved on Mar. 11, 2011]; Retrieved from the Internet URL: http://www.techcrunch.com/2007/1/4/adbrite-makes-brilliant-video-product; 12 pages.
Arrington, Michael, "TechCrunch—Cisco and Click.tv?," [online][Retrieved on Mar. 11, 2011]; Retrieved from the Internet URL: http;//www.techcrunch.com/2007/07/30/cisco-and-clicktv/; 4 pages.

(56) References Cited

OTHER PUBLICATIONS

Arrington, Michael, "TechCrunch—Click.tv Moves Video Ideas Forward," [online][Retrieved on Mar. 11, 2011] Retrieved from the Internet URL: http://www.techcrunch.com/2006/04/16/clicktv-moves-video-ideas-forward/; 6 pages.
Arrington, Michael, "TechCrunch—FuckedCompany's Adbrite Spawn Goes 2.0," [online][Retrieved on Mar. 11, 2011]; Retrieved from the Internet URL: http://www.techcrunch.com/2007/01/04/adbrite-makes-brilliant-video-product; 5 pages.
Asterpix Interactive Video, 'Introducing Hypervideo', [online] [retrieved on Nov. 26, 2007]. Retrieved from http://www.asterpix.com/help/learnmore/introducing/.
Crist, Ry, "Logitech Harmony's Alexa Skill just got a whole lot better", cnet, Jul. 13, 2017 (2 pages).
CrunchBase Company Profile, 'ScanScout', Jul. 24, 2007 [online][retrieved on Nov. 26, 2007]. Retrieved from http://www.crunchbase.com/company/ScanScout.
Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11story2.html?t=printable.
Dominguez, Catherine, "BroadRamp technology will make TV shows virtual mall", San Antonio Business Journal, The Essential Business Tool, Jun. 11, 2007, pp. 1-3, http://sanantonio.bizjournals.com/sanantonio/stories/2007/06/11/story3.html.
Dominguez, Catherine, "BroadRamp technology will make TV shows virtual mall." [online][Retrieved on Mar. 16, 2011]; Retrieved from the Internet URL: http//www.bizjournals.com/sanantonio/stories/2007/06/11/sotry3.html; 3 pages.
Gibbs, Samuel, "Your Facebook Messenger app is about to be filled with ads", The Guardian, Jul. 12, 2017 (3 pages).
Gonzalez, Nick, "TechCrunch—Video Ads: Every Startup Has a Different Solution," [online][Retrieved on Mar. 11, 2011]; Retrieved from the Internet URL: http://www.techcrunch.com/2007/07/06/video-ads-somebody-needs-to-solve-this-problem/; 8 pages.
Gonzalez, Nick, "TechCrunch—YuMe Closes $9 Million Series B," [online] [Retrieved on Mar. 16, 2011]: Retrieved from the Internet URL: http://techcrunch.com/2007/10/16/yume-closes-9-million-series-b/; 1 page.
Hardwick, Tim, "Facebook Smart Speaker Coming Next Year With 15-inch Touch Panel", MacRumors, Jul. 25, 2017 (5 pages).
Hendrickson, Mark, "TechCrunch—Time Warner Invests in Video Ads Startup ScanScout,", [online] [Retrieved on Mar. 11, 2011]; Retrieved from the Internet URL: http://www.techcrunch.com/2007/09/09/time-warner-backs-video-ads-through=scanscout/; 6 pages.
International Preliminary Report on Patentablity for PCT/US2008/084982 dated Jun. 10, 2010, 5 pages.
International Search Report and Written Opinion on PCT Application PCT/US2008/84982, dated Jun. 23, 2009, 8 pages.
Kelion, Leo, "Amazon's race to make Alexa smarter", BBC News, Jul. 28, 2017 (8 pages).
Notice of Allowance for U.S. Appl. No. 13/490,912, dated Jan. 7, 2014,17 pages.
Ooyala, 'Overview', [online] [retrieved on Nov. 26, 2007]. Retrieved from http://www.ooyala.com/about.
Riley, Duncan, "TechCrunch—Contextual In-Video Advertising: ScanScout," [online] [Retrieved on Mar. 11, 2011]; Retrieved from the Internet URL: http://www.techcrunch.com/2007/0514/contextual-in-video=-advertising-scanscout/; 5 pages.
Techcrunch, 'Cisco and Click.tv?', Jul. 30, 2007, [online] [retrieved on Nov. 26, 2007]. Retrieved from http://www.techcrunch.com/2007/07/30/cisco-and-clicktv/.
Techcrunch, 'Hulu Makes First Acquisition; Chinese Video Startup to Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.
Techcrunch, 'Video Ads: Every Startup has a Different Solution', Jul. 6, 2007 [online][retrieved on Nov. 26, 2007]. Retrieved from http://www.techcrunch.com2007/07/06/video-ads-somebody-needs-to-solve-this-problem.
U.S. Notice of Allowance for U.S. Appl. No. 11/948,643, dated Feb. 27, 2012 (12 pages).
U.S. Office Action dated Dec. 9, 2010, for U.S. Appl. No. 11/948,643 (20 pages).
U.S. Office Action for U.S. Appl. No. 13/490,912, dated Apr. 16, 2013, 31 pages.
U.S. Office Action for U.S. Appl. No. 13/490,912, dated Aug. 2, 2012, 25 pages.
U.S. Office Action on U.S. Appl. No. 13/932,836 dated Aug. 16, 2017 (15 pages).
U.S. Office Action on U.S. Appl. No. 15/584,940 dated Aug. 14, 2017 (15 pages).
YuMe Networks, 'About Us', [online] [retrieved on Nov. 26, 2007]. Retrieved from http://yumenetworks.com/about.html.
Non-Final Office Action on U.S. Appl. No. 15/395,689 dated Aug. 21, 2019, 13 pages.
Notice of Allowance on U.S. Appl. No. 15/190,897 dated Aug. 27, 2019, 14 pages.
Notice of Allowance on U.S. Appl. No. 15/584,746 dated Aug. 7, 2019, 8 pages.
Communication pursuant to Article 94(3) EPC dated Feb. 22, 2019 for Appl. Ser. No. 17768558.3 (8 pages).
DE Office Action for Appl. Ser. No. 11 2017 000 122.6 dated Sep. 5, 2018 (1 page).
International Preliminary Report on Patentability for Appl. Ser. No. PCT/US2017/049713 dated Jul. 11, 2019 (8 pages).
JP Office Action for Appl. Ser. No. 2017-556891 dated Feb. 18, 2019 (13 pages).
KR Office Action for Appl. Ser. No. 10-2017-7031189 dated Nov. 29, 2018 (12 pages).
U.S. Notice of Allowance for U.S. Appl. No. 15/190,897 dated May 6, 2019 (15 pages).
U.S. Office Action for U.S. Appl. No. 14/190,523 dated May 7, 2018 (28 pages).
U.S. Office Action for U.S. Appl. No. 15/190,897 dated May 18, 2018 (33 pages).
U.S. Office Action for U.S. Appl. No. 15/190,897 dated Nov. 16, 2018 (39 pages).
U.S. Office Action for U.S. Appl. No. 15/395,689 dated Mar. 22, 2019 (13 pages).
U.S. Office Action for U.S. Appl. No. 15/395,689 dated Sep. 13, 2018 (13 pages).
U.S. Office Action for U.S. Appl. No. 15/584,746 dated Apr. 2, 2019 (14 pages).
U.S. Office Action for U.S. Appl. No. 15/584,746 dated Oct. 29, 2018 (14 pages).
U.S. Office Action for U.S. Appl. No. 15/638,304 dated Jul. 1, 2019 (10 pages).
U.S. Office Action for U.S. Appl. No. 15/638,304 dated Mar. 7, 2019 (12 pages).
U.S. Office Action for U.S. Appl. No. 15/638,333 dated Jun. 26, 2019 (19 pages).
Yamato et al., "Ubiquitous Service Composition Technology for Ubiquitous Network Environments", NTT Network Service Systems Laboratories, NTT Corporation, vol. 48 No. 2, Feb. 2007, pp. 562-577 (16 pages).
Examination Report for EP Application Ser. No. 17768558.3 dated Apr. 3, 2020 (9 pages).
Advisory Action for U.S. Appl. No. 15/638,333 dated Feb. 28, 2020 (4 pages).
Final Office Action for U.S. Appl. No. 15/395,689 dated Mar. 5, 2020 (14 pages).
Final Office Action for U.S. Appl. No. 15/638,333 dated Dec. 17, 2019 (19 pages).
Non-Final Office Action for U.S. Appl. No. 15/638,304 dated Dec. 2, 2019 (10 pages).
Notice of Allowance for U.S. Appl. No. 13/168,904 dated Jan. 10, 2014 (8 pages).

(56) References Cited

OTHER PUBLICATIONS

Notice of Allowance for U.S. Appl. No. 15/190,897 dated Oct. 25, 2019 (16 pages).
Notice of Allowance for U.S. Appl. No. 15/584,746 dated Feb. 12, 2020 (5 pages).
Notice of Allowance for U.S. Appl. No. 15/395,689 dated Oct. 28, 2020 (7 pages).
Final Office Action for U.S. Appl. No. 15/638,304 dated Nov. 16, 2020 (11 pages).
Examination Report for IN Appln. Ser. No. 201747045160 dated Apr. 28, 2020 (7 pages).
Notice of Allowance for U.S. Appl. No. 15/395,689 dated Jul. 29, 2020 (7 pages).
Notice of Allowance for U.S. Appl. No. 15/584,746 dated Jul. 31, 2020 (5 pages).
Corrected Notice of Allowability for U.S. Appl. No. 15/395,689 dated Sep. 9, 2020 (2 pages).
Notice of Reasons for Rejection for JP Appln. Ser. No. 2019-135381 dated Aug. 17, 2020 (11 pages).
First Office Action for CN Appln. Ser. No. 201780001369.6 dated Jul. 3, 2020 (18 pages).
Non-Final Office Action for U.S. Appl. No. 15/638,333 dated Aug. 6, 2020 (25 pages).
Notice of Allowance for U.S. Appl. No. 15/638,304 dated May 6, 2021 (11 pages).
Final Office Action for U.S. Appl. No. 15/638,333 dated Jan. 28, 2021 (19 pages).
Notice of Allowance for U.S. Appl. No. 15/584,746 dated Feb. 11, 2021 (5 pages).
Supplemental Notice of Allowability for U.S. Appl. No. 15/395,689 dated Jan. 6, 2021 (2 pages).
Second Office Action for CN Appln. Ser. No. 201780001369.6 dated Apr. 8, 2021 (7 pages).
Decision of Rejection for JP Appln. Ser. No. 2019-135381 dated Mar. 1, 2021 (6 pages).

* cited by examiner

IMAGE RECOGNITION-BASED CONTENT ITEM SELECTION

CROSS-REFERENCE TO RELATED APPLICATIONS

The present application claims the benefit of priority under 35 U.S.C. § 120 as a continuation-in-part of U.S. patent application Ser. No. 14/190,523, filed on Feb. 26, 2014, which claims the benefit of priority under 35 U.S.C. § 120 as a of U.S. patent application Ser. No. 13/168,904, filed Jun. 24, 2011. The present application also claims the benefit of priority under 35 U.S.C. § 120 as a continuation-in-part of U.S. patent application Ser. No. 15/395,689, filed Dec. 30, 2016. Each of the foregoing are hereby incorporated by reference herein in their entirety.

BACKGROUND

This specification relates to content presentation. Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

This specification describes technologies relating to content presentation. The present disclosure is generally directed to improving the efficiency and effectiveness of information transmission and processing over disparate computing resources. It is challenging for disparate computing resource to efficiently process, and consistently and accurately parse image or audio-based instructions in a computing environment. For example, the disparate computing resources may not have access to the same voice models, or may have access to out of date or unsynchronized voice models that can make it challenging to accurately and consistently parse the image or audio-based instructions.

In general, one aspect of the subject matter described in this specification can be embodied in methods that include the actions of receiving a request for an ad to be presented to a user; for a collection of ads, identifying one or more candidate ads including using image keywords derived from images associated with the user to identify the one or more candidate ads; selecting an ad responsive to the ad request from the candidate ads; and sending the selected ad for presentation to the user. Other embodiments of this aspect include corresponding systems, apparatus, and computer programs recorded on computer storage devices, each configured to perform the operations of the methods.

These and other embodiments can each optionally include one or more of the following features. The image keywords are derived from images uploaded by the user. The images include images captured by the user using a camera of a mobile device. The image keywords are derived from images selected by the user. Selecting an ad responsive to the ad request includes determining a similarity between one or more keywords associated with each ad of the collection of ads and the image keywords. Determining the similarity include calculating a similarity score for each ad and where selecting the ad responsive to the ad request includes using a combination of the similarity score and one or more other scores for each. Each image keyword is associated with a scoring weight for scoring the respective image keywords relative to the ads in the collection of ads and where the weight decreases according to age of the image keyword. The ad request is the first ad request following user image activity. The image content is used to directly infer the user's intent.

Particular embodiments of the subject matter described in this specification can be implemented so as to realize one or more of the following advantages. Using keywords derived from images uploaded or selected by a user provides information for presenting ads directed to the user's interests. Images can provide context for identifying ads in situations where there may be little context available, for example, for mobile applications. Images can also provide user intent directly. For example, if the input image is for a digital camera, the system can identify suitable ads based on the image content.

At least one aspect is directed to a system to selecting content based on image data. The system can include a data processing system having one or more processors and memory to execute instructions. The data processing system can receive, via an application executed by a computing device connected to a network, an image captured by a camera of the computing device. The data processing system can analyze the image to identify a pattern that matches a predetermined pattern of an object stored in an image pattern database comprising a plurality of predetermined patterns of objects. The data processing system can identify one or more image keywords from the image based on the predetermined pattern of the object that matches the image. The data processing system can select, based on a comparison of the one or more image keywords with one or more keywords of each of a plurality of content items, a content item. The data processing system can provide, to the computing device, the content item to cause the computing device to present the content item.

At least one aspect is directed to a method of selecting content based on image data. The method can include a data processing system receiving, via an application executed by a computing device connected to a network, an image captured by a camera of the computing device. The method can include the data processing system analyzing the image to identify a pattern that matches a predetermined pattern of an object stored in an image pattern database comprising a plurality of predetermined patterns of objects. The method can include the data processing system identifying one or more image keywords from the image based on the predetermined pattern of the object that matches the image. The method can include the data processing system selecting, based on a comparison of the one or more image keywords with one or more keywords of each of a plurality of content items, a content item. The method can include the data processing system providing, to the computing device, the content item to cause the computing device to present the content item.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Images can be used to provide context for selecting ads. In particular, images associated with a user can provide context in situations where there is little context available, for example, when serving ads to mobile applications. The image context can include one or more keywords derived from images associated with particular users. For example, users can upload images (for example, to a photo album, a search system, or mail system as an attachment), which can be processed to identify keywords. Alternatively, images selected by users (e.g., in response to presented image search results) can be processed to identify keywords. These keywords can be used to identify particular ads for presentation to the respective users in response to an ad request.

While reference will be made below to content selection systems and methods, other forms of content including other forms of content items can be managed, presented, and logged in accordance with the description below.

Figure 1A:
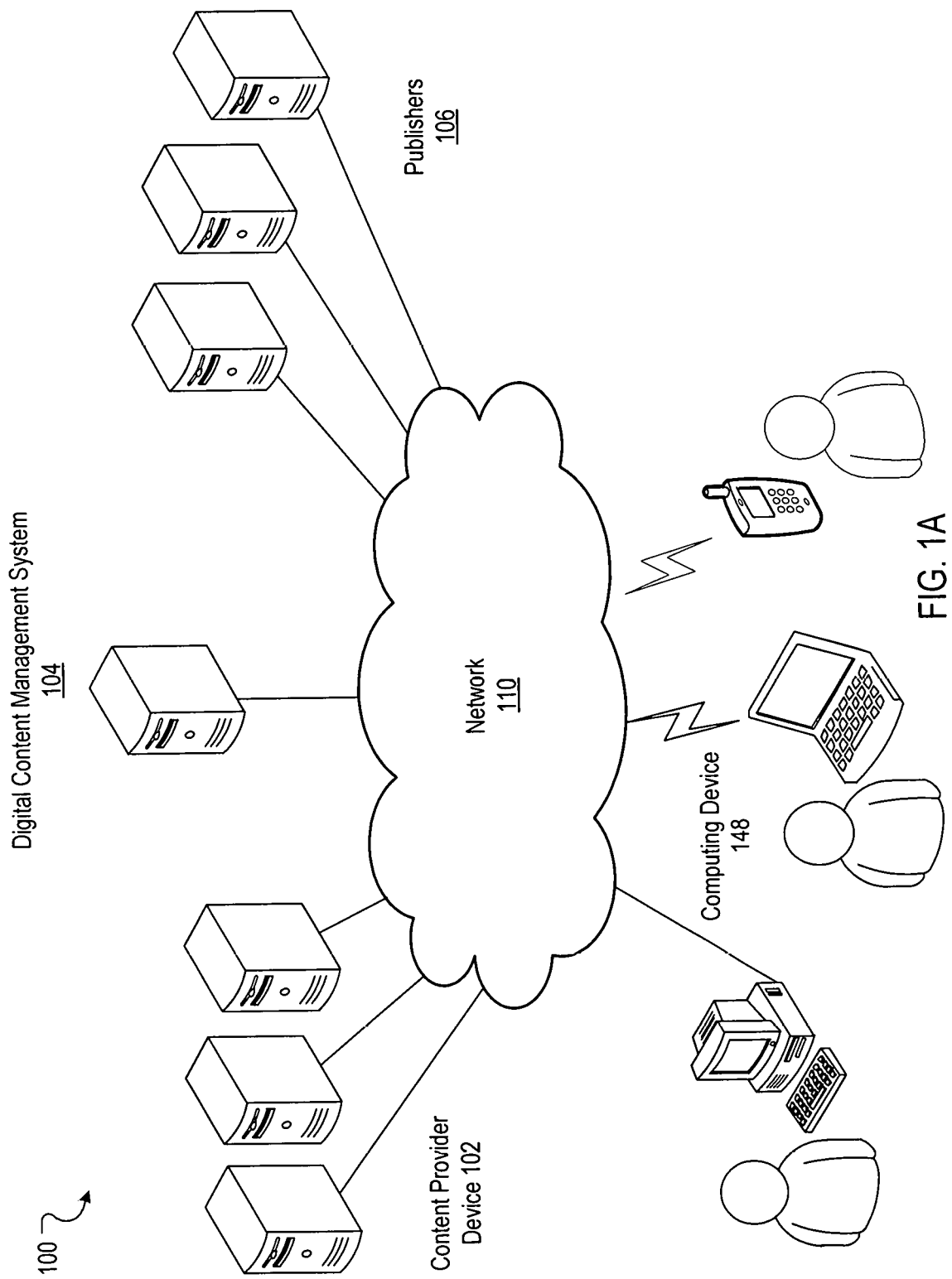
FIG. 1A is a diagram of an example content presentation system.

FIG. 1 is a block diagram of an example content presentation system 100. In some implementations, one or more content provider device 102 can directly, or indirectly, enter, maintain, and log ad information in an digital content management system 104 ("system 104"). Though reference is made to content selection, other forms of content, including other forms of sponsored content, can be delivered by the system 100. The ads can be in the form of graphical ads, for example, banner ads, text only ads, image ads, barcode ads (e.g., ads that include one or more barcodes, for example, for use in redeeming the particular ad), audio ads, video ads, animated ads, ads combining one or more of any of such components, etc. The ads can also include embedded information, such as links, meta-information, and/or machine executable instructions. One or more Computing device 148 may submit requests for ads to the system 104. The system 104 responds by sending ads to the requesting Computing device 148 for placement on or association with one or more of a publisher's 106 content items (e.g., web properties, mobile applications, or other third party content). Example web properties can include web pages, television and radio content slots, or print media space.

Computing device 148 and the content provider device 102, can provide usage information to the system 104, for example, whether or not a conversion (e.g., a purchase or other interaction) or a click-through related to an ad (e.g., a user has selected an ad) has occurred. This usage information can include measured or observed user behavior related to ads that have been served. The system 104 may perform financial transactions, for example, crediting the publishers 106 and charging the content provider device 102 based on the usage information.

A network 110, such as a local area network (LAN), wide area network (WAN), the Internet, one or more telephony networks or a combination thereof, connects the content provider device 102, the system 104, the publishers 106, and the Computing device 148.

One example publisher 106 is a general content server that receives requests for content (e.g., articles, discussion threads, music, video, graphics, search results, web page listings, information feeds, etc.), and retrieves the requested content in response to the request.

The user 108 can submit a request for ads to a content server in the system 104. The ad request can include a number of ads desired. The ad request can also include content request information, including information associated with the user 108 or the user's device (e.g., a mobile device), as described in greater detail below.

In some implementations, a client browser, application, or other content provider, combines the requested content with one or more of the ads provided by the system 104. The combined content and ads can be rendered to the Computing device 148 that requested the content for presentation in a viewer (e.g., a browser, application interface, or other content display system) of a computing device. The computing device can transmit information about the ads back to the content server, including information describing how, when, and/or where the ads are to be rendered (e.g., in HTML or JavaScript™). In some implementations, the content and ads are combined separately. For example, content can be rendered while waiting for ads to be received and incorporated into the content.

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results. In some implementations, the search results can be presented to users with one or more ads.

A user 108, or the user's device, can submit a request for ads to the system 104. The request may include a number of ads desired. The system 104 can use various information to identify a group of ads to provide to the user 108. Ads from this group of ads can be provided by the user's device for presentation in response to a request from a user application, or associated with content to be displayed (e.g., a web page or search results). Thus, ads can be provided directly to the computing device for presentation or indirectly through content provided to the computing device (e.g., ads presented with search results where the ads are provided to the user with the search results).

In some implementations, the digital content management system 104 can use a content selection process to select ads from the content provider device 102, which can then be provided to the Computing device 148 in response to the receive requests for ads. For example, the content provider device 102 may be permitted to select, or bid, an amount the content providers are willing to pay for each presentation of or interaction with (e.g., click) of an ad, e.g., a cost-per-click amount a content provider pays when, for example, a user clicks on an ad. The cost-per-click can include a maximum cost-per-click, e.g., the maximum amount the content provider is willing to pay for each click of an ad based on a keyword, e.g., a word or words in a query. Other bid types, however, can also be used. Based on these bids, ads can be selected and ranked for presentation.

The user 108 can combine the search results with one or more of the ads provided by the system 104. This combined information can then be displayed by the devices of the Computing device 148 that requested the content. Alternatively, portions can be received at different times and integrated in the display as received. For example, the ads can be received and rendered separately by a browser or application. The search results can be maintained as distinct from the ads, so as not to confuse the user between paid ads and presumably neutral search results.

In some implementations, one or more publishers 106 provide web properties to the Computing device 148. The Computing device 148 submit requests for ads to the digital content management system 104. The system 104 responds by sending ads to the requesting Computing device 148 for placement on one or more web properties (e.g., websites and other network-distributed content) that are relevant to the web property. In some implementations, the user's device identifies a particular ad from the received ads for presentation with the provided web properties. In some implementations, the requests are executed by devices associated with the user 108, e.g., by the execution of a particular script (e.g., JavaScript™) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the digital content management system 104 for placement in the mobile application when accessed by a user (e.g., when a particular page of a mobile application is loaded on the mobile device).

Figure 1B:
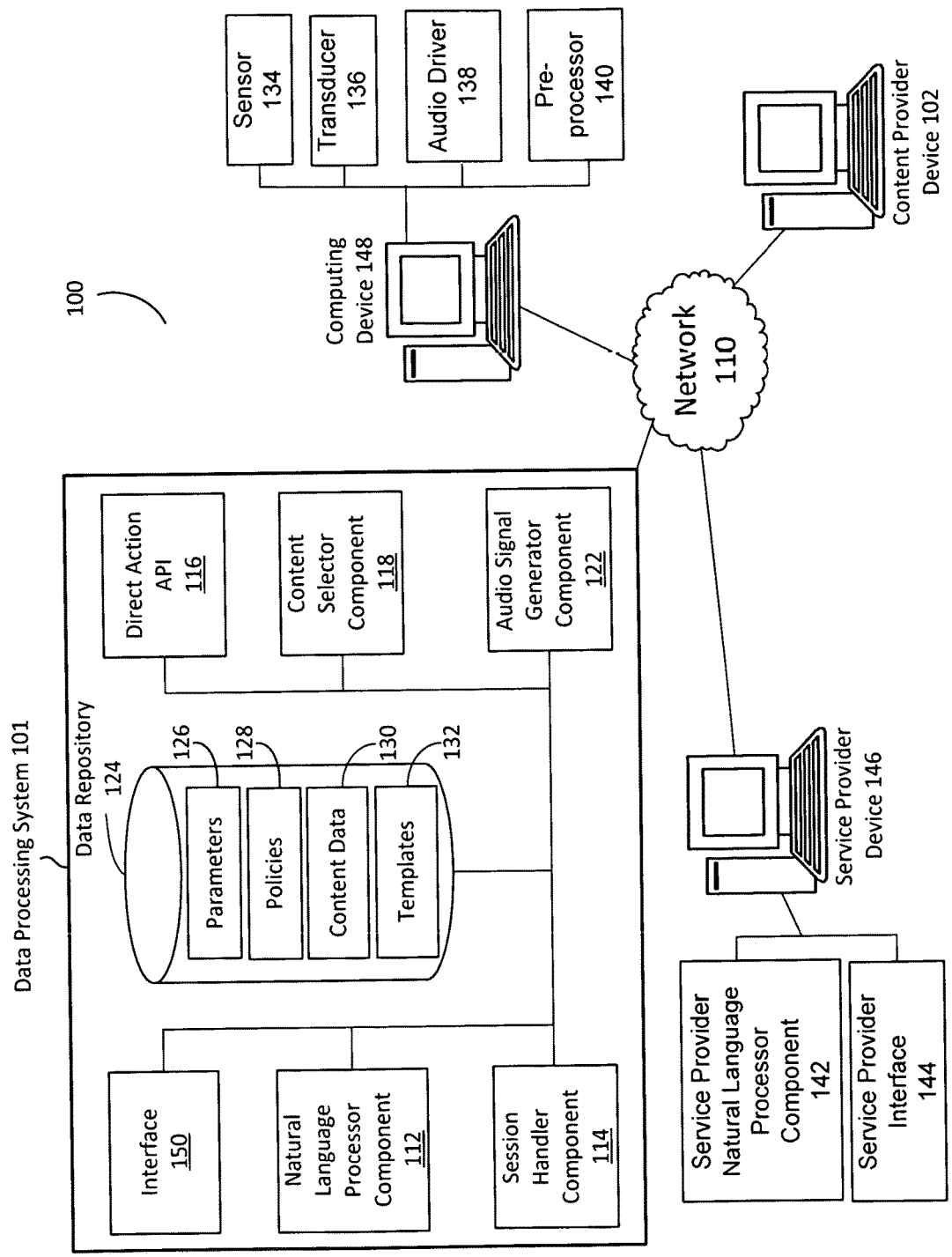
FIG. 1B is an illustration of a system to route packetized actions via a computer network.

FIG. 1B illustrates an example system 100 to route packetized actions via a computer network. The system 100 can include content selection infrastructure. The system 100 can include a data processing system 101. The data processing system 101 can communicate with one or more of a content provider computing device 102, service provider computing device 146, or client computing device 148 via a network 110. The network 110 can include computer networks such as the Internet, local, wide, metro, or other area networks, intranets, satellite networks, and other communication networks such as voice or data mobile telephone networks. The network 110 can be used to access information resources such as web pages, web sites, domain names, or uniform resource locators that can be presented, output, rendered, or displayed on at least one computing device 148, such as a laptop, desktop, tablet, personal digital assistant, smart phone, portable computers, or speaker. For example, via the network 110 a user of the computing device 148 can access information or data provided by a service provider 146 or content provider 102. The computing device 148 may or may not include a display; for example, the computing device may include limited types of user interfaces, such as a microphone and speaker. In some cases, the primary user interface of the computing device 148 may be a microphone and speaker.

The network 110 can include or constitute a display network, e.g., a subset of information resources available on the internet that are associated with a content placement or search engine results system, or that are eligible to include third party content items as part of a content item placement campaign. The network 110 can be used by the data processing system 101 to access information resources such as web pages, web sites, domain names, or uniform resource locators that can be presented, output, rendered, or displayed by the client computing device 148. For example, via the network 110 a user of the client computing device 148 can access information or data provided by the content provider computing device 102 or the service provider computing device 146.

The network 110 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 110 may include a wireless link, such as an infrared channel or satellite band. The topology of the network 110 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 101. The data processing system 101 can include at least one logic device such as a computing device having a processor to communicate via the network 110, for example with the computing device 148, the content provider device 102 (content provider 102), or the service provider device 146 (or service provider 146). The data processing system 101 can include at least one computation resource, server, processor or memory. For example, the data processing system 101 can include a plurality of computation resources or servers located in at least one data center. The data processing system 101 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 101 components, including servers and storage systems, and coupling them with advanced system management tools allows more efficient use of server resources, which saves power and processing requirements and reduces bandwidth usage.

The system 100 can include, access, or otherwise interact with at least one service provider device 146. The service provider device 146 can include at least one logic device such as a computing device having a processor to communicate via the network 110, for example with the computing device 148, the data processing system 101, or the content provider 102. The service provider device 146 can include at least one computation resource, server, processor or memory. For example, service provider device 146 can include a plurality of computation resources or servers located in at least one data center. The service provider device 146 can include one or more component or functionality of the data processing system 101.

The content provider computing device 102 can provide audio based content items for display by the client computing device 148 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 102 can also provide audio based content items (or other content items) to the data processing system 101 where they can be stored in the data repository 124. The data processing system 101 can select the audio content items and provide (or instruct the content provider computing device 148 to provide) the audio content items to the client computing device 148. The audio based content items can be exclusively audio or can be combined with text, image, or video data.

The service provider device 146 can include, interface, or otherwise communicate with at least one service provider natural language processor component 142 and a service provider interface 144. The service provider computing device 146 can include at least one service provider natural language processor (NLP) component 142 and at least one service provider interface 144. The service provider NLP component 142 (or other components such as a direct action API of the service provider computing device 146) can engage with the client computing device 148 (via the data processing system 101 or bypassing the data processing system 101) to create a back-and-forth real-time voice or audio based conversation (e.g., a session) between the client computing device 148 and the service provider computing device 146. The service provider NLP 142 can include one or more function or feature as the NLP component 112 of the data processing system 101. For example, the service provider interface 144 can receive or provide data messages to the direct action API 116 of the data processing system 101. The service provider computing device 146 and the content provider computing device 102 can be associated with the same entity. For example, the content provider computing device 102 can create, store, or make available content items for a car sharing service, and the service provider computing device 146 can establish a session with the client computing device 102 to arrange for a delivery of a taxi or car of the car share service to pick up the end user of the client computing device 148. The data processing system 101, via the direct action API 116, the NLP component 112 or other components can also establish the session with the client computing device, including or bypassing the service provider computing device 148, to arrange for example for a delivery of a taxi or car of the car share service.

The computing device 148 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 101 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 101 for further processing. The pre-processor 140 can convert the analog audio signals detected by the microphone into a digital audio signal, and transmit one or more data packets carrying the digital audio signal to the data processing system 101 via the network 110. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 101.

The client computing device 148 can be associated with an end user that enters voice queries as audio input into the client computing device 148 (via the sensor 134) and receives audio output in the form of a computer generated voice that can be provided from the data processing system 101 (or the content provider computing device 102 or the service provider computing device 146) to the client computing device 148, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 148 and the data processing system 101 (or the service provider computing device 146). The content data 130 can include content items for audio output or associated metadata, as well as input audio messages that can be part of one or more communication sessions with the client computing device 148.

The data processing system 101 can include a content placement system having at least one computation resource or server. The data processing system 101 can include, interface, or otherwise communicate with at least one interface 150. The data processing system 101 can include, interface, or otherwise communicate with at least one natural language processor component 112. The data processing system 101 can include, interface, or otherwise communicate with at least one direct action application programming interface ("API") 116. The data processing system 101 can include, interface, or otherwise communicate with at least one session handler 114. The data processing system 101 can include, interface, or otherwise communicate with at least one content selector component 118. The data processing system 101 can include, interface, or otherwise communicate with at least one audio signal generator 122. The data processing system 101 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 102 or obtained or determined by the data processing system to facilitate content selection. The content data 130 can include, for example, historical performance of a content campaign.

The interface 150, natural language processor component 112, session handler 114, direct action API 116, content selector component 118, or audio signal generator component 122 can each include at least one processing unit or other logic device such as programmable logic array engine, or module configured to communicate with the database repository or database 124. The interface 150, natural language processor component 112, session handler 114, direct action API 116, content selector component 118, audio signal generator component 122 and data repository 124 can be separate components, a single component, or part of the data processing system 101. The system 100 and its components, such as a data processing system 101, can include hardware elements, such as one or more processors, logic devices, or circuits.

The data processing system 101 can obtain anonymous computer network activity information associated with a plurality of computing devices 148. A user of a computing device 148 can affirmatively authorize the data processing system 101 to obtain network activity information corresponding to the user's computing device 148. For example, the data processing system 101 can prompt the user of the computing device 148 for consent to obtain one or more types of network activity information. The identity of the user of the computing device 148 can remain anonymous and the computing device 148 can be associated with a unique identifier (e.g., a unique identifier for the user or the computing device provided by the data processing system or a user of the computing device). The data processing system can associate each observation with a corresponding unique identifier.

A content provider 102 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 102 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 101 or content provider 102), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 148. In some cases, an impression can refer to a viewable or audible impression; e.g., the content item object is at least partially (e.g., 20%, 30%, 30%, 40%, 50%, 60%, 70%, or more) viewable on a display device of the client computing device 148, or audible via a speaker 136 of the computing device 148. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 102 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 102 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 102 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 102 can provide one or more keywords to be used by the data processing system 101 to select a content item object provided by the content provider 102. The content provider 102 can identify one or more keywords to bid on, and further provide bid amounts for various keywords. The content provider 102 can provide additional content selection criteria to be used by the data processing system 101 to select content item objects. Multiple content providers 102 can bid on the same or different keywords, and the data processing system 101 can run a content selection process responsive to receiving an indication of a keyword of an electronic message.

The content provider 102 can provide one or more content item objects for selection by the data processing system 101. The data processing system 101 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 101 can transmit the content item object for rendering on a computing device 148 or display device of the computing device 148. Rendering can include displaying the content item on a display device, or playing the content item via a speaker of the computing device 148. The data processing system 101 can provide instructions to a computing device 148 to render the content item object. The data processing system 101 can instruct the computing device 148, or an audio driver 138 of the computing device 148, to generate audio signals or acoustic waves.

The data processing system 101 can include an interface component 150 designed, configured, constructed, or operational to receive and transmit information using, for example, data packets. The interface 150 can receive and transmit information using one or more protocols, such as a network protocol. The interface 150 can include a hardware interface, software interface, wired interface, or wireless interface. The interface 150 can facilitate translating or formatting data from one format to another format. For example, the interface 150 can include an application programming interface that includes definitions for communicating between various components, such as software components.

The data processing system 101 can include an application, script or program installed at the client computing device 148, such as an app to communicate input audio signals to the interface 150 of the data processing system 101 and to drive components of the client computing device to render output audio signals. The data processing system 101 can receive data packets or other signal that includes or identifies an audio input signal. For example, the data processing system 101 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 101 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 101. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 101 can serve.

The audio input signal can be detected by the sensor 134 or transducer 136 (e.g., a microphone) of the client computing device 148. Via the transducer 136, the audio driver 138, or other components the client computing device 148 can provide the audio input signal to the data processing system 101 (e.g., via the network 110) where it can be received (e.g., by the interface 150) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning."

The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 146. In some cases, the NLP component 112 can transmit the individual requests to respective service provider devices 146, or separately transmit both requests to the same service provider device 146.

The data processing system 101 can include a direct action API 116 designed and constructed to generate, based on the trigger keyword, an action data structure responsive to the request. Processors of the data processing system 101 can invoke the direct action API 116 to execute scripts that generate a data structure to a service provider device 146 to request or order a service or product, such as a car from a car share service. The direct action API 116 can obtain data from the data repository 124, as well as data received with end user consent from the client computing device 148 to determine location, time, user accounts, logistical or other information to allow the service provider device 146 to perform an operation, such as reserve a car from the car share service. Using the direct action API 116, the data processing system 101 can also communicate with the service provider device 146 to complete the conversion by in this example making the car share pick up reservation.

The direct action API 116 can execute a specified action to satisfy the end user's intention, as determined by the data processing system 101. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 148 to ask the end user questions such as the intended destination of a requested taxi. The direct action API 116 can determine necessary parameters and can package the information into an action data structure, which can then be sent to another component such as the content selector component 118 or to the service provider computing device 146 to be fulfilled.

The direct action API 116 can receive an instruction or command from the NLP component 112, or other component of the data processing system 101, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 146 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 101 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 148 or a user interface of the device 148. For example, the direct action APT 116 can detect the source location using a location sensor, such as a GPS sensor. The direct action API 116 can obtain further information by submitting a survey, prompt, or query to the end of user of the computing device 148. The direct action API can submit the survey, prompt, or query via interface 150 of the data processing system 101 and a user interface of the computing device 148 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 146.

The data processing system 101 can select the template based from the template data structure 132 based on various factors including, for example, one or more of the trigger keyword, request, third party provider device 146, type of third party provider device 146, a category that the third party provider device 146 falls in (e.g., taxi service, laundry service, flower service, or food delivery), location, or other sensor information.

To select the template based on the trigger keyword, the data processing system 101 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the third party provider device 146 can process to establish a communication session.

In some cases, the data processing system 101 can identify a third party provider device 146 based on the trigger keyword. To identify the third party provide 146 based on the trigger keyword, the data processing system 101 can perform a lookup in the data repository 124 to identify a third party provider device 146 that maps to the trigger keyword. For example, if the trigger keyword includes "ride" or "to go to", then the data processing system 101 (e.g., via direct action API 116) can identify the third party provider device 146 as corresponding to Taxi Service Company A. The data processing system 101 can select the template from the template database 132 using the identify third party provider device 146. For example, the template database 132 can include a mapping or correlation between third party provider devices 146 or entities to templates configured to generate an action data structure responsive to the trigger keyword that the third party provider device 146 can process to establish a communication session. In some cases, the template can be customized for the third party provider device 146 or for a category of third party provider devices 146. The data processing system 101 can generate the action data structure based on the template for the third party provider 146.

To construct or generate the action data structure, the data processing system 101 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 101 can identify the values for the fields to populate the fields of the template to create the action data structure. The data processing system 101 can obtain, retrieve, determine or otherwise identify the values for the fields by performing a look-up or other query operation on the data repository 124.

In some cases, the data processing system 101 can determine that the information or values for the fields are absent from the data repository 124. The data processing system 101 can determine that the information or values stored in the data repository 124 are out-of-date, stale, or otherwise not suitable for the purpose of constructing the action data structure responsive to the trigger keyword and request identified by the NLP component 112 (e.g., the location of the client computing device 148 may be the old location and not be the current location; an account can be expired; the destination restaurant may have moved to a new location; physical activity information; or mode of transportation).

If the data processing system 101 determines that it does not currently have access, in memory of the data processing system 101, to the values or information for the field of the template, the data processing system 101 can acquire the values or information. The data processing system 101 can acquire or obtain the information by querying or polling one or more available sensors of the client computing device 148, prompting the end user of the client computing device 148 for the information, or accessing an online web-based resource using an HTTP protocol. For example, the data processing system 101 can determine that it does not have the current location of the client computing device 148, which may be a needed field of the template. The data processing system 101 can query the client computing device 148 for the location information. The data processing system 101 can request the client computing device 148 to provide the location information using one or more location sensors 134, such as a Global Positioning System sensor, WIFI triangulation, cell Lower triangulation, Bluetooth beacons, IP address, or other location sensing technique.

The direct action API 116 can transmit the action data structure to a third party provider device (e.g., service provider device 146) to cause the third party provider device 146 to invoke a conversational application programming interface (e.g., service provider NLP component 142) and establish a communication session between the third party provider device 146 and the client computing device 148. Responsive to establishing the communication session between the service provider device 146 and the client computing device 1004, the service provider device 146 can transmit data packets directly to the client computing device 148 via network 110. In some cases, the service provider device 146 can transmit data packets to the client computing device 148 via data processing system 101 and network 110.

In some cases, the third party provider device 146 can execute at least a portion of the conversational API 142. For example, the third party provider device 146 can handle certain aspects of the communication session or types of queries. The third party provider device 146 may leverage the NLP component 112 executed by the data processing system 101 to facilitate processing the audio signals associated with the communication session and generating responses to queries. In some cases, the data processing system 101 can include the conversational API 142 configured for the third party provider 146. In some cases, the data processing system routes data packets between the client computing device and the third party provider device to establish the communication session. The data processing system 101 can receive, from the third party provider device 146, an indication that the third party provider device established the communication session with the client device 148. The indication can include an identifier of the client computing device 148, timestamp corresponding to when the communication session was established, or other information associated with the communication session, such as the action data structure associated with the communication session.

In some cases, the conversational API can be a second NLP that includes one or more component or function of the first NLP 112. The second NLP 142 can interact or leverage the first NLP 112. In some cases, the system 100 can include a single NLP 112 executed by the data processing system 101. The single NLP 112 can support both the data processing system 101 and the third party service provider device 146. In some cases, the direct action API 116 generates or construct an action data structure to facilitate performing a service, and the conversational API generates responses or queries to further a communication session with an end user or obtain additional information to improve or enhance the end user's experience or performance of the service.

The data processing system 101 can include, execute, access, or otherwise communicate with a session handler component 114 to establish a communication session between the client device 148 and the data processing system 101. The communication session can refer to one or more data transmissions between the client device 148 and the data processing system 101 that includes the input audio signal that is detected by a sensor 134 of the client device 148, and the output signal transmitted by the data processing system 101 to the client device 148. The data processing system 101 (e.g., via the session handler component 114) can establish the communication session responsive to receiving the input audio signal. The data processing system 101 can set a duration for the communication session. The data processing system 101 can set a timer or a counter for the duration set for the communication session. Responsive to expiration of the timer, the data processing system 101 can terminate the communication session.

The communication session can refer to a network-based communication session in which the client device 148 provides authenticating information or credentials to establish the session. In some cases, the communication session refers to a topic or a context of audio signals carried by data packets during the session. For example, a first communication session can refer to audio signals transmitted between the client device 148 and the data processing system 101 that are related to (e.g., include keywords, action data structures, or content item objects) a taxi service; and a second communication session can refer to audio signals transmitted between the client device 148 and data processing system 101 that are related to a laundry and dry cleaning service. In this example, the data processing system 101 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 101 can initiate or establish the second session for the audio signals related to the dry cleaning and laundry service responsive to detecting the context of the audio signals.

The data processing system 101 can include, execute, or otherwise communicate with a content selector component 118 to receive the trigger keyword identified by the natural language processor and select, based on the trigger keyword, a content item via a real-time content selection process. The content selection process can refer to, or include, selecting sponsored content item objects provided by third party content providers 102. The real-time content selection process can include a service in which content items provided by multiple content providers are parsed, processed, weighted, or matched in order to select one or more content items to provide to the computing device 148. The content selector component 118 can perform the content selection process in real-time. Performing the content selection process in real-time can refer to performing the content selection process responsive to the request for content received via the client computing device 148. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 148, or within a time interval after the communication session is terminated.

For example, the data processing system 101 can include a content selector component 118 designed, constructed, configured or operational to select content item objects. To select content items for display in a voice-based environment, the data processing system 101 (e.g., via NLP component 112) can parse the input audio signal to identify keywords (e.g., a trigger keyword), and use the keywords to select a matching content item based on a broad match, exact match, or phrase match. For example, the content selector component 118 can analyze, parse, or otherwise process subject matter of candidate content items to determine whether the subject matter of the candidate content items correspond to the subject matter of the keywords or phrases of the input audio signal detected by the microphone of the client computing device 148. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

Content providers 102 may provide additional indicators when setting up a content campaign that includes content items. The content provider 102 may provide information at the content campaign or content group level that the content selector component 118 may identify by performing a lookup using information about the candidate content item. For example, the candidate content item may include a unique identifier, which may map to a content group, content campaign, or content provider. The content selector component 118 may determine, based on information stored in content campaign data structure in data repository 124, information about the content provider 102.

The data processing system 101 can receive, via a computer network, a request for content for presentation on a computing device 148. The data processing system 101 can identify the request by processing an input audio signal detected by a microphone of the client computing device 148. The request can include selection criteria of the request, such as the device type, location, and a keyword associated with the request. The request can include the action data structure or action data structure.

Responsive to the request, the data processing system 101 can select a content item object from data repository 124 or a database associated with the content provider 102, and provide the content item for presentation via the computing device 148 via network 110. The content item object can be provided by a content provider device 146 different from the service provider device 146. The content item can correspond to a type of service different from a type of service of the action data structure (e.g., taxi service versus food delivery service). The computing device 148 can interact with the content item object. The computing device 148 can receive an audio response to the content item. The computing device 148 can receive an indication to select a hyperlink or other button associated with the content item object that causes or allows the computing device 148 to identify service provider 146, request a service from the service provider 146, instruct the service provider 146 to perform a service, transmit information to the service provider 146, or otherwise query the service provider device 146.

The data processing system 101 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 123 Main Street for destination location, 2 for number of passengers, and economy for the level of service. The audio signal generator component 122 can generate the first portion of the output signal in order to confirm that the end user of the computing device 148 wants to proceed with transmitting the request to the service provider 146. The first portion can include the following output "Would you like to order an economy car from taxi service provider A to pick two people up at 123 Main Street and drop off at 1234 Main Street?"

In some cases, the first portion can include information received from the service provider device 146. The information received from service provider device 146 can be customized or tailored for the action data structure. For example, the data processing system 101 (e.g., via direct action API 116) can transmit the action data structure to the service provider 146 before instructing the service provider 146 to perform the operation. Instead, the data processing system 101 can instruct the service provider device 146 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 146 can return the preliminary information to the data processing system 101 or directly to the client computing device 148 via the network 148. The data processing system 101 can incorporate the preliminary results from the service provider device 146 into the output signal, and transmit the output signal to the computing device 148. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 101 can form a second portion of the output signal. The second portion of the output signal can include a content item selected by the content selector component 118 during a real-time content selection process. The first portion can be different from the second portion. For example, the first portion can include information corresponding to the action data structure that is directly responsive to the data packets carrying the input audio signal detected by the sensor 134 of the client computing device 148, whereas the second portion can include a content item selected by a content selector component 148 that can be tangentially relevant to the action data structure, or include sponsored content provided by a content provider device 102. For example, the end user of the computing device 148 can request a taxi from Taxi Service Company A. The data processing system 101 can generate the first portion of the output signal to include information about the taxi from the Taxi Service Company A. However, the data processing system 101 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 101 may nonetheless provide a content item from Taxi Service Company B because the user may choose to perform an operation with Taxi Service Company B.

The data processing system 101 can transmit information from the action data structure to the Taxi Service Company B to determine a pick-up time, time of arrival at the destination, and a price for the ride. The data processing system 101 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 148 can then select the ride provided by Taxi Service Company A or the ride provided by Taxi Service Company B.

Prior to providing, in the second portion of the output signal, the sponsored content item corresponding to the service provided by Taxi Service Company B, the data processing system 101 can notify the end user computing device that the second portion corresponds to a content item object selected during a real-time content selection process (e.g., by the content selector component 118). However, the data processing system 101 can have limited access to different types of interfaces to provide the notification to the end user of the computing device 148. For example, the computing device 148 may not include a display device, or the display device may be disabled or turned off. The display device of the computing device 148 may consume greater resources than the speaker of the computing device 148, so it may be less efficient to turn on the display device of the computing device 148 as compared to using the speaker of the computing device 148 to convey the notification. Thus, in some cases, the data processing system 101 can improve the efficiency and effectiveness of information transmission over one or more interfaces or one or more types of computer networks. For example, the data processing system 101 (e.g., via the audio signal generator component 122) can module the portion of the output audio signal comprising the content item to provide the indication or notification the end user that that portion of the output signal comprises the sponsored content item.

The data processing system 101 (e.g., via interface 150 and network 110) can transmit data packets comprising the output signal generated by the audio signal generator component 122. The output signal can cause the audio driver component 138 of or executed by the client device 148 to drive a speaker (e.g., transducer 136) of the client device 148 to generate an acoustic wave corresponding to the output signal.

Figure 2:
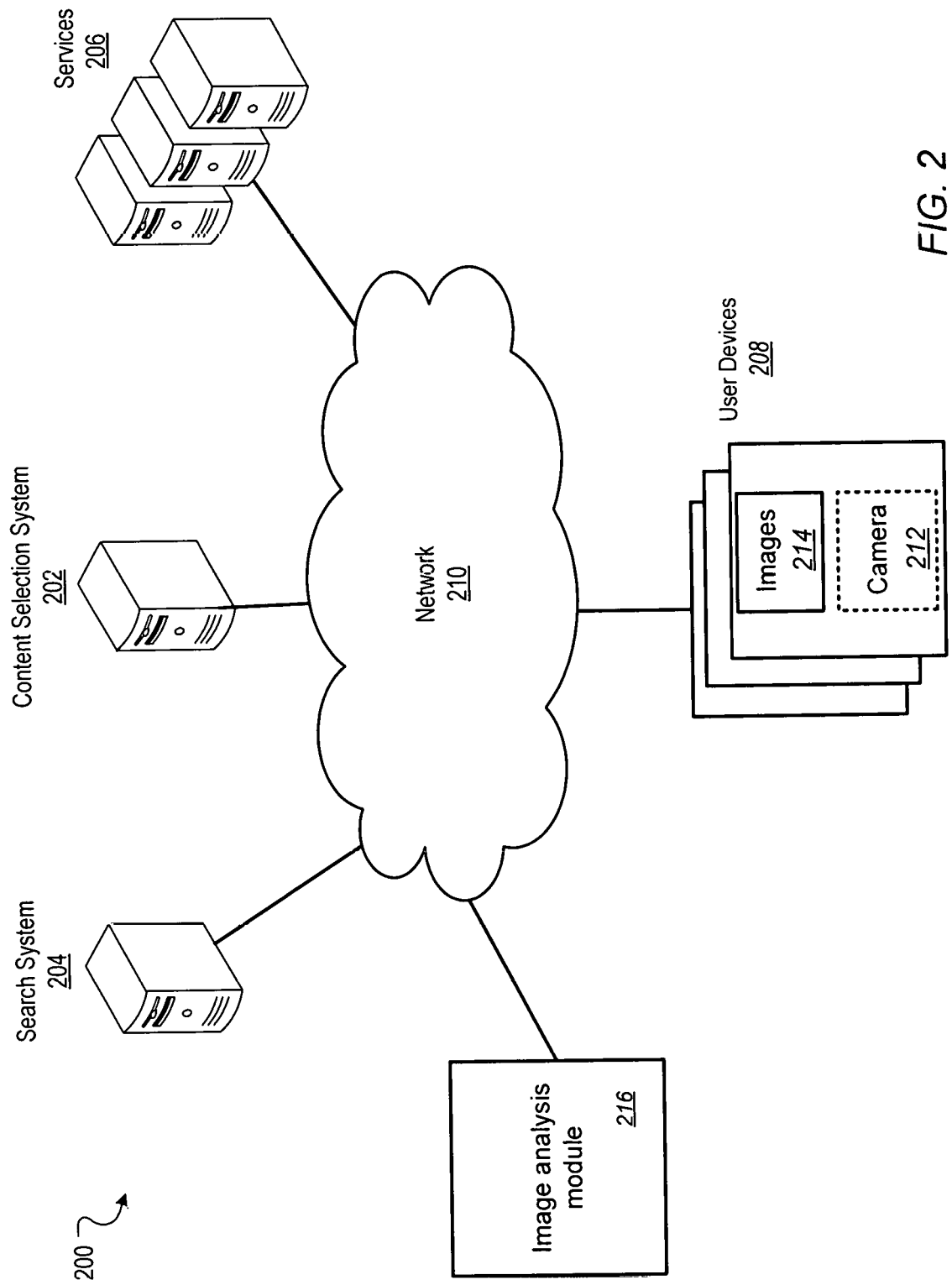
FIG. 2 is a diagram of an example system.

FIG. 2 is a diagram of an example system 200. The example system 200 includes an content selection system 202 (e.g., data processing system 101, system 104, system 100), a search system 204, services 206, and an image analysis module 216, each of which can communicate through one or more network 210.

The content selection system 202 provides ads for presentation to users (e.g., of computing devices 208) in response to ad requests. The ad requests can be received from the computing devices 208 or from other sources, for example, the search system 204 or content publishers (not shown). The content selection system 202 can use image keywords associated with particular users to identify candidate ads to provide to the computing devices 208.

The search system 204 can provide search results to the computing devices 208 responsive to received queries. In some implementations, the search results are image search results, for example, thumbnail images corresponding to image resources responsive to the received query. Users presented with image search results can select particular images from the image search results in order to view the corresponding image resource. Image search results can be provided with one or more ads, for example, in a particular portion or portions of the search user interface. In some implementations, the search system 204 includes an image search in which users can submit images as a query (e.g., an image taken from a camera on a mobile device).

The services 206 can include network photo albums or other photo repositories to which individual users can upload images. The services 206 can also include a mail service where, for example, users can receive images in messages or can attach images in massages to be sent to others.

The computing devices 208 can include mobile devices, desktop computing devices, notebook computing devices, personal data assistants, tablet devices, etc. One or more of the computing devices 208 can include a camera 212. The camera 212 can be a still camera or a video camera. The camera 212 can be, for example, a camera integrated into the device (e.g., a mobile device with an integrated camera) or a camera attached to a computing device (e.g., a webcam attached to a desktop computer).

The computing devices 208 also includes images 214. The images 214 can include images captured using camera 212 or from various other sources. For example, a user can transfer images from a digital camera to the images 214. In another example, a user can receive images from other users or network locations (e.g., by downloading the images or receiving images by e-mail). One or more images from the images 214 can also be uploaded to network locations using the network 210. For example, a user can upload one or more images to a web album provided by the services 206 or as a query to an image search provided by the search system 204. In some implementations, the images are encrypted prior to being uploaded.

The system 200 can include an image analysis module 216. In some cases, the data processing system 101 can include or interface with the image analysis module 216. The image analysis module 216 can analyze images uploaded, for example, to search system 204 or to services 206 in order to identify image keywords. The image analysis module 216 can also analyze images selected by users, for example, from presented image search results. The image analysis module 216 can then send the image keywords to the ad system 202. Image analysis is described in greater detail below. In some implementations, the image analysis module 216 is part of a system affiliated with each of the search system 204, ad system 202, and image services 206. In some other implementations, the image analysis module 216 is a component of one or more of the search system 204, ad system 202, and image services 206. In some implementations, the images are encrypted prior to being uploaded to the image analysis module 216. Additionally, uploaded images can be stored in a protected database and/or not logged into the system. The image analysis module 216 can receive images from client computing devices 146, for example via data processing system 101.

Figure 3:
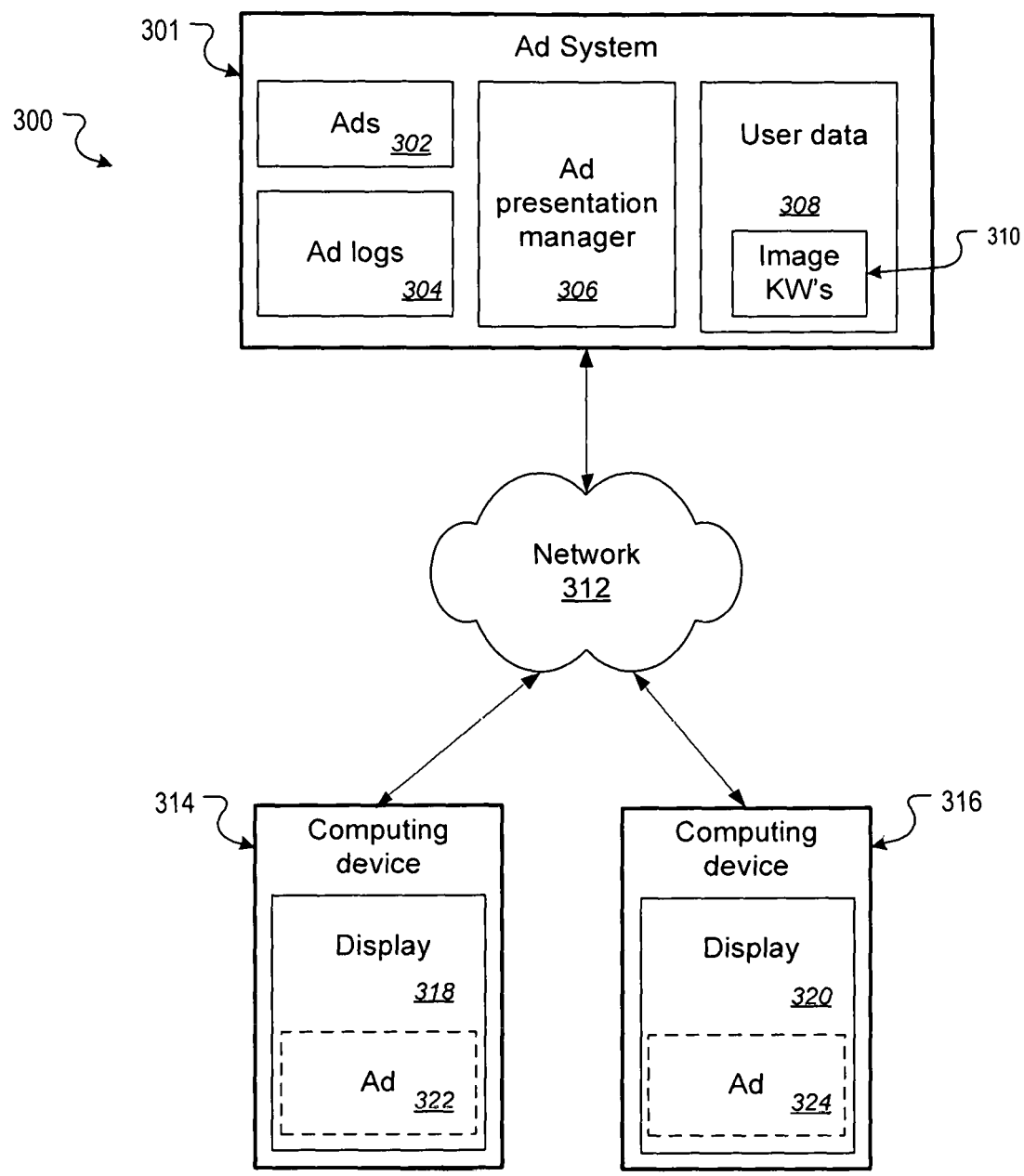
FIG. 3 is an example system for serving ads.

FIG. 3 is an example system 300 for serving ads. The system 300 includes an ad system 301, computing device 314, and computing device 316. The ad system 301 can communicate with each of the computing devices 314 and 316 through a network 312.

The ad system 301 includes ads 302, ad logs 304, ad presentation manager 306, and user data 308.

The ads 302 are a collection of ads available for presentation to users. Each ad can include associated information used to determine whether the ad should be presented to a user in response to a request, for example, keywords associated with the ad and demographic goals for the ad (e.g., particular demographic groups to which the ad is directed). The ad presentation manager 306 can select ads for presentation on computing devices. The ad logs 304 can store presentation and conversion events (e.g., users an ad is presented to, time stamps, ad identifiers, device identifiers, wallet status of ads, user ad selections, publisher conversion events, etc.).

The ad presentation manager 306 can determine which ad or ads of the ads 302 to select for presentation (e.g., on computing device 314 and/or computing device 316) in response to an ad request. For example, the ad presentation manager 306 can identify and rank candidate ads from the ads 302 based on particular criteria in order to match ads with requested content, a requesting API for an application, and/or a requesting user.

The ad presentation manager 306 can identify candidate ads for selection based on keywords associated with the ads in the collection that correspond with the ad request. In some implementations, the ad keywords can be matched with the requested content in which the ads are to be presented (e.g., matching ad keywords to keywords in requested content or query terms). For example, each ad of the ads 302 can include one or more keywords for identifying ads as directed to particular subject matter that can be matched to the ad request. Thus, particular ads can be identified as relevant to particular users. Candidate ads for selection can be identified based on how well the keywords match the request.

In another example, the ad presentation manager 306 uses information about a user (e.g., user profile information, other demographic information) to identify candidate ads for selection. For example, particular ads in the ads 302 can include demographics information (e.g., intended for women between the ages of 30 and 35). This demographic information can be compared with the user information to determine whether or not an ad is a candidate ad for selection.

In yet another example, the ad presentation module 306 can send ads to an application based on the specific application requesting the ads (e.g., the ads are for products or services that appeal to a typical user of the particular application) or based on user interactions with the application.

The ad presentation manager 306 can further use image keywords associated with the user in identifying ads for presentation, for example, by matching image keywords with ad keywords to identify ad candidates. In some implementations, image keywords are only used to identify ads in particular circumstances. For example, when other sources of information are insufficient or unavailable (e.g., lack of other user information or lack of information associated with the content with which the ad is to be presented). In another example, image keywords are only used within a particular time window of the user image activity (e.g., when the associated image is also associated with the ad request or the ad request follows particular image activity, for example, an image upload or selection). In some implementations, the image is used to identify a primary user intent, e.g., if the user submits an image to the image search system in order to obtain information regarding the image. For example, if the user uploads a particular image, the content of that image can be used to identify relevant ads to present to the user.

In some implementations, content selection system is used to determine which ad from candidate ads matching criteria for the content will be selected for presentation or to adjust scores for candidate ads. In some other implementations, the candidate ad having a highest score is selected for presentation. The selected ad can then be sent for presentation to the user (e.g., sent directly to the computing device or sent to a publisher or other content provider for integration prior to providing the content to the computing device).

The user data 308 can include user information such as user profile information that can be used by the ad presentation manager 306 in identifying matching ads. The user data 308 also includes image keywords 310. The image keywords are keywords derived from particular images associated with each particular user. In some implementations, the keywords are derived in response to a user uploading an image (e.g., an image taken using a camera on a computing device) to a search system. For example, the user can upload an image to be used as a search query. In some other implementations, the keywords are derived in response to a user uploading an image to an image service, for example, to an online photo album. Another image source associated with the user includes images received by or sent to the user using e-mail. A further image source can be images selected by the user, e.g., based on presented image search results.

In some implementations, one or more of the search system and services are affiliated with the ad system in order to facilitate the sharing of derived keyword information.

The image keywords can be derived from various techniques. These keywords can then be provided to the ad system 301 for storage within the image keywords 310. In some implementations, images associated with the user are directly analyzed. For example, an image can be analyzed to identify text within the image (e.g., using optical character recognition techniques). Identified words or phrases from the image can then be considered keywords. For example an image including a visible sign reading "Tour Eiffel" can yield as keywords "Eiffel" and "Tour". Additionally, the image can be identified for particular patterns matching known objects. For example a picture of a car can be matched with an image in an image database. Images in the database can have a particular descriptor or caption which can also be used as keywords (e.g., "Peugeot 504").

In some implementations, images associated with the user are indirectly analyzed. For example, an image (or a discernable object within the image) is matched with existing objects in an image database and metadata associated with those existing objects in the image database are analyzed to obtain keywords. For example, the photo may be similar to a photo from an online guidebook of Paris, and any metadata about the latter (URL, anchor text, etc.) can be analyzed to obtain keywords, e.g. www.paris.example.com/eiffel may yield "paris" and "eiffel" as keywords. Additionally, when a URL is identified, the target location (e.g., a web page) can be crawled to obtain keywords.

In some other implementations, referring search terms can be used to identify keywords. For example, once a matching image is found, search history logs (for images search or any other property) can be analyzed to identify which search queries led to (a) that image being served as a search result and (b) resulted in the image being selected. The search terms can be considered keywords, and their importance can be weighted based on the frequency of occurrence as well as whether they led to a selection of the image. For example, the image from the online guidebook of Paris may be served when the user types "Paris" or "Eiffel", but clicked more often in the latter case.

The keywords obtained from these methods can be ranked based on various information and filtered to identify the most likely keywords. Additionally, the image keywords can be expanded for each image or user based on vertical information (e.g., higher level categories associated with the identified keywords, for example, "France" for the keyword "Paris"). For example, a system that generates keywords for the image can compute a confidence weight associated with an image-keyword pair and provide that to the ad presentation system. These weights can be used to identify dominant keywords for particular images.

In some implementations, the keywords can be also compared with historical logs to identify best performing keywords for the image (or some representation of the concepts the image contains). Different measures of performance can be used to identify best performing keywords including, for example, aggregated click through rate on the ads, user's refinement of the query in the context of a search etc. From an ad presentation perspective, preference can be given to commercial keywords that the content providers are directing their ads to. Additionally, data from the user's past queries and/or interactions can be used to rank the keywords. For example, if the system knows (e.g., based on past user information) that the user owns a camera of a particular brand, keywords that represent accessories for the particular camera brand can be preferred.

In some implementations, user information is anonymized to obscure the user's identify. For example, received information from users (e.g., user interactions, location, device or user identifiers) can be aggregated or removed/obscure (e.g., replace user identifier with random identifier) so that individually identifying information is anonymized while still maintaining the attributes or characteristics associated with particular information (e.g., types of user actions). In some other implementations, the received information is anonymized (so that the originating computing device or computing device user is unidentifiable) at the computing device before transmission to the system that analyzes the received inputs. In this way, the actions of individual users can be obscured or unobservable while still permitting analysis of user information. Additionally, users can opt-in or opt-out of making data for images associated with the user available to the ad system (e.g., for use in identifying appropriate ads). In some implementations, a notification procedure is used to prompt the user and a user interface can be provided to transparently view and modify privacy settings.

In some implementations, users can specify types of images that can be analyzed. For example, the user can specify that only images uploaded in particular contexts are included. Thus, the user can specify that images uploaded to a search system can be used but not those uploaded to a private album or to a social site. In some implementations, the system has default settings that can be modified by a user. The default settings can be designed to be overly limiting on the criteria for using images associated with the user.

In some other implementations, the system or user can specify particular types of images that are not analyzed or used to identify keywords. For example, images can be processed, on a network location or on the client device, to identify images containing people. As a result of the processing, for example, images recognized as having people can be excluded while images recognized as containing objects can be used.

The computing devices 314 and 316 each include a respective display 318 and 320 for presenting content to the user of the device. For example, the display can be used to present application content. The display can also be used to present publisher content or search result content using a web browser. The display of content can include the presentation of one or more ads e.g., ad 322 or ad 324.

Figure 4:
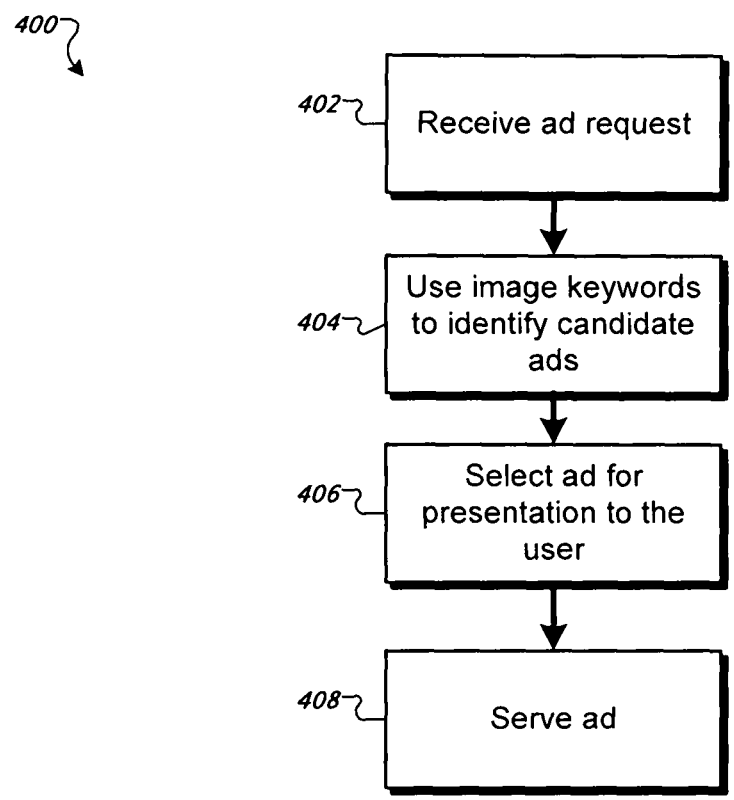
FIG. 4 is an example process for presenting ads to users.

FIG. 4 is an example process 400 for presenting ads to users. The process 400 can be performed by a system including one or more computing devices. For example, the process 400 can be performed by an ad system, e.g., the ad system 300 of FIG. 3.

An ad request is received (402). The ad request can be received by an ad system from a publisher. For example, a publisher can request an ad to be provided for content to be served to the computing device. The ad can be provided to the publisher for inclusion in the content prior to sending to the computing device or, alternatively, the ad can be served directly to the computing device.

In some other implementations, the client device requests the ad from the ad system. For example, the computing device can request an ad in response to rendering content from the publisher. A script in received web page content form a publisher can prompt the computing device browser to send an ad request. Alternatively, presenting particular application content (e.g., content in a mobile application) can prompt an ad request to be sent to the ad system.

In response to the received ad request, candidate ads are identified using image keywords (404). Image keywords associated with the user can be identified based on the ad request. For example, the ad request can include a user identifier for the user. Image keywords associated with that user can be identified and compared with ad keywords. Ads can be scored based on the degree of match between the ad keywords and the identified image keywords associated with the user. Candidate ads can include ads having a threshold score or a specified number of top scoring ads. In some implementations, the score of the image keyword matching alone is used to identify candidate ads.

In some other implementations, the image keyword matching score is combined with one or more other scores to generate overall ad scores (e.g., scores based on the content to be presented or user demographic information).

In some implementations, the score for the image keyword matching can be discounted according to the age of the image keyword (e.g., how long ago the particular image keywords were added). Thus, keywords associated with more recent user image activity is weighted more heavily than older user image activity. A specified decay function can be used to adjust the image keyword weight.

In some implementations, the ad request is sent contemporaneously with analysis of a particular image such that the image keywords are associated with recent user activity. For example, an ad can be presented directly in response to a received image, where the ad is selected based on image keywords derived from the received image. This can occur, for example, when the image is uploaded through a content provider that includes one or more ads. For example, a user can attach an image to an e-mail message in an e-mail interface that includes one or more ads. The attached image can be analyzed and used to determine a next ad to present to the user (e.g., when the ads are refreshed in the e-mail interface). In some other implementations, the received image keywords are used to identify subsequent ad or ads to be presented to the user.

A particular ad of the candidate ads is selected for presentation to the user (406). In some implementations, a candidate ad having a highest overall score is selected for presentation to the user. The score can be calculated using a combination of scores for a variety of types of information including a score for the matching of image keywords to ads. In some other implementations, a content selection process is used to identify a particular ad of the candidate ads for presentation.

The selected ad is sent for presentation (408). In some implementations, the ad is sent directly to the client device associated with the ad request. The ad can then be incorporated into particular content (e.g., application content). In some other implementations, the ad is sent to a content provider that incorporates the ad into the content before providing the content to the computing device.

Figure 5:
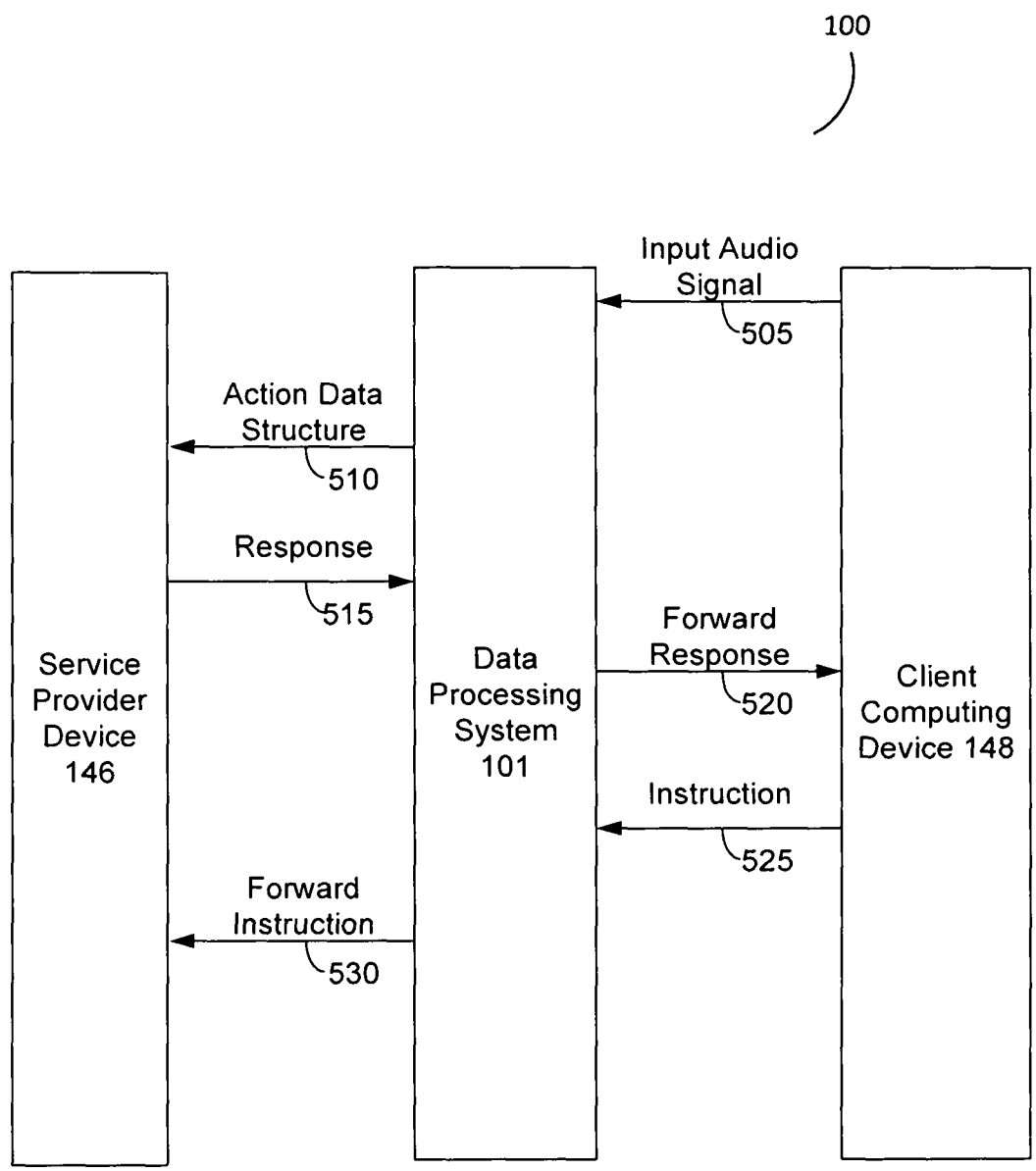
FIG. 5 is an illustration of an operation of a system to route packetized actions via a computer network.

FIG. 5 is an illustration of the system 100 to route packetized actions via a computer network. The system can include one or more component of system 100 depicted in FIG. 1. At 505, the client computing device 148 can transmit data packets carrying the input audio signal detected by a microphone or other sensor of the computing device 148. The client computing device 148 can transmit the input audio signal to the data processing system 101. The data processing system 101 can parse the input audio signal to identify a keyword, request or other information to generate an action data structure responsive to the request.

At ACT 510, the data processing system 101 can transmit the action data structure to the service provider device 146 (or third party provider device 146). The data processing system 101 can transmit the action data structure via a network. The service provider device 146 can include an interface configured to receive and process the action data structure transmitted by the data processing system 101.

The service provider device 146 (e.g., via a conversational API) can respond to the action data structure at ACT 515. The response from the service provider device 146 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 146 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service providers 146 within the taxi service category. However, a certain taxi service provider 146 can choose to customize and improve the operation by requesting additional information or preferences from the client computing device 148.

The service provider device 146 can transmit one or more data packets carrying the response to the data processing system 101 at ACT 515. The data processing system 101 can parse the data packets and identify a source of the data packets and a destination for the data packets. At ACT 520, the data processing system 101 can, accordingly, route or forward the data packets to the client computing device 148. The data processing system 101 can route or forward the data packets via network 110.

At ACT 525, the client computing device 148 can transmit an instruction or command to the data processing system 101 based on the forwarded response. For example, the response forwarded at 525 can be a request for a number of passengers and a confirmation to proceed with scheduling the taxi ride. The instruction at 525 can include the number of passengers and the instruction to proceed with scheduling the pickup. The client device 148 can transmit one or more data packets carrying the instruction to the data processing system 101. The data processing system 101 can route or forward the data packets carrying the instructions to the service provider device 146 at ACT 530.

In some cases, the data processing system 101 can route or forward the data packets at ACT 520 or ACT 530 as-is (e.g., without manipulating the data packets). In some cases, the data processing system 101 can process the data packets to filter out information, or encapsulate the data packets with information to facilitate processing of the data packets by the service provider device 146 or the client computing device 148. For example, the data processing system 101 can mask, hide, or protect the identity of the client computing device 148 from the service provider device 146. Thus, the data processing system 101 can encrypt identifying information using a hash function such that the service provider 146 cannot directly identify a device identifier or username of the client computing device 148. The data processing system 101 can maintain a mapping of the proxy identifier provided to the service provider device 146 for use during the communication session to the identifier or username of the client computing device 148.

Figure 6:
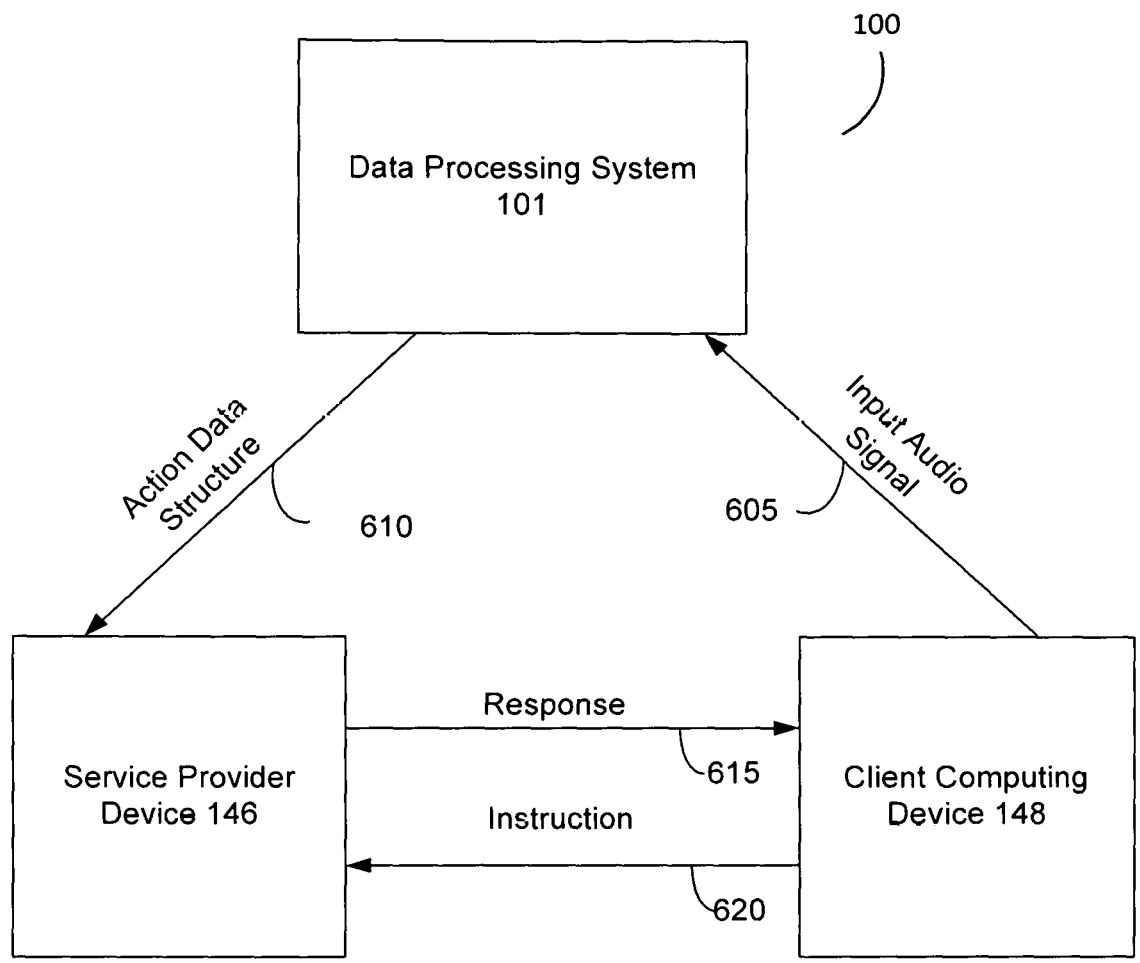
FIG. 6 is an illustration of an operation of a system to route packetized actions via a computer network.

FIG. 6 is an illustration of the system 100 to route packetized actions via a computer network. The system can include one or more component of system 100 depicted in FIG. 1B. At 605, the client computing device 148 can transmit data packets carrying the input audio signal detected by a microphone or other sensor of the computing device 148. The client computing device 148 can transmit the input audio signal to the data processing system 101. The data processing system 101 can parse the input audio signal to identify a keyword, request or other information to generate an action data structure responsive to the request.

At ACT 610, the data processing system 101 can transmit the action data structure to the service provider device 146 (or third party provider device 146). The data processing system 101 can transmit the action data structure via a network. The service provider device 146 can include an interface configured to receive and process the action data structure transmitted by the data processing system 101.

The service provider device 146 (e.g., via a conversational API) can respond to the action data structure at ACT 615. The response from the service provider device 146 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 146 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service providers 146 within the taxi service category. However, a certain taxi service provider 146 can choose to customize and improve the operation by requesting additional information or preferences from the client computing device 148.

The service provider device 146 can transmit one or more data packets carrying the response directly to the client computing device 148 via a network 110. For example, instead of routing the response through the data processing system 101, the service provider device 146, via a conversational API executed by the service provider device 146, can respond directly to the client computing device 148. This can allow the service provider to customize the communication session.

At ACT 620, the client computing device 148 can transmit an instruction or command to service provider device 146 based on the response. For example, the response provided at 615 can be a request for a number of passengers and a confirmation to proceed with scheduling the taxi ride. The instruction at 620 can include the number of passengers and the instruction to proceed with scheduling the pickup. The client device 148 can transmit one or more data packets carrying the instruction to the service provider device 146 instead of routing the data packets through the data processing system 101.

The data processing system 101 can facilitate the service provider device 146 and the client computing device 148 establishing a communication session independent of the data processing system 101 by passing communication identifiers to the respective devices. For example, the data processing system 101 can forward an identifier of the device 148 to the device 146; and the data processing system 101 can forward an identifier of the device 146 to the device 148. Thus, the device 146 can establish the communication session directly with the device 148.

In some cases, the device 146 or device 148 can separately forward information, such as status information, about the communication session to the data processing system 101. For example, the device 146 can provide, to the data processing system, an indication that the device 146 successfully established the communication session with the client device 148.

Figure 7:
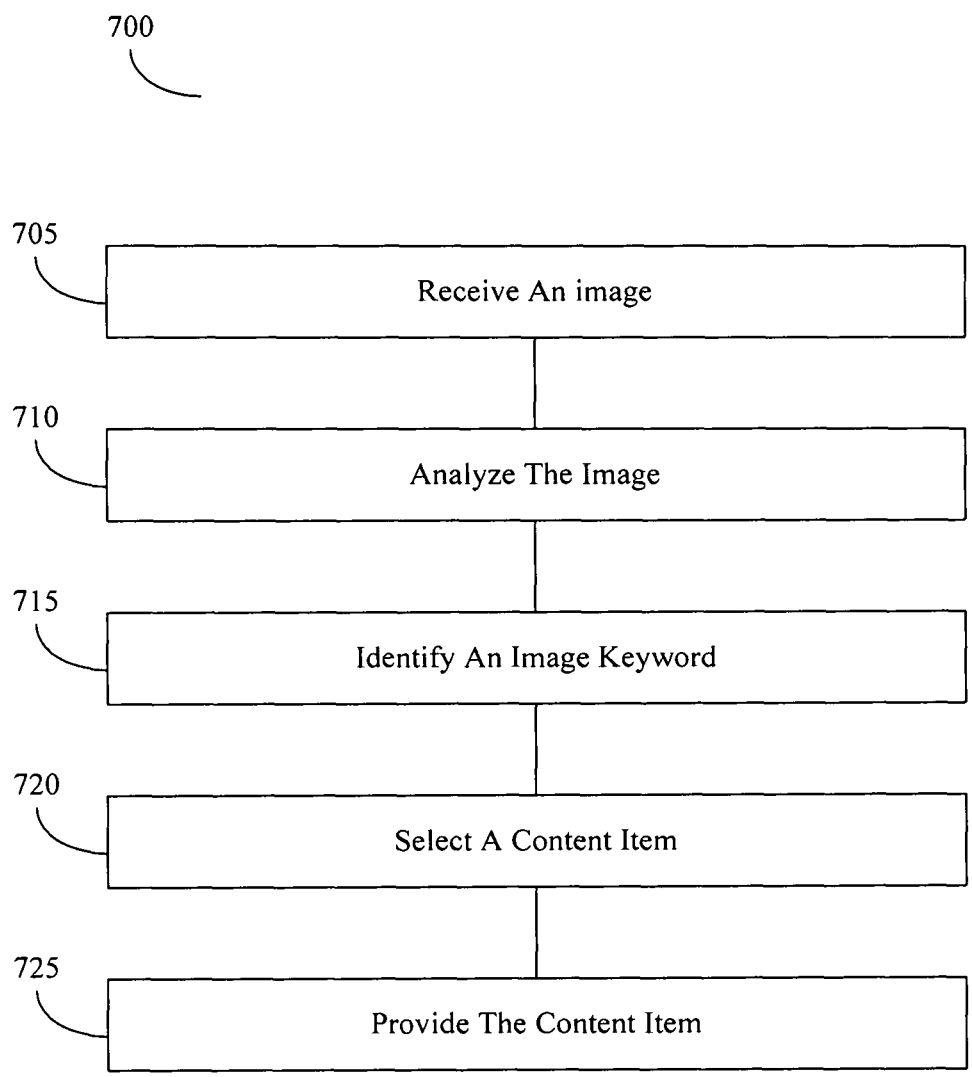
FIG. 7 is an illustration of method to serve content items.

FIG. 7 is an illustration of a method to serve content items. The method 700 can be performed by one or more system or component depicted in FIG. 1A, FIG. 1B, FIG. 2, FIG. 3, FIG. 5, or FIG. 6. For example, the method 700 can be performed by one or more of a data processing system 101, digital content management system 104, computing device 148, content provider device 102, or service provider device 146.

At ACT 705, the data processing system can receive an image. The data processing system can receive the image from a computing device. The image can be captured by a sensor or camera coupled to or integrated with the computing device. The image can be downloaded by the computing device, and then transmitted the data processing system.

At ACT 710, the data processing system can analyze the image. The data processing system can analyze the image to identify a pattern that matches a predetermined pattern of an object stored in an image pattern database comprising a plurality of predetermined patterns of objects. The data processing system can be configured with image interpretation technique, image processing techniques, or machine learning techniques to identify the patterns. The data processing system can, for example, use an image analysis module to identify the patterns.

At ACT 715, the data processing system can identify an image keyword. The data processing system can identify one or more image keywords from the image based on the predetermined pattern of the object that matches the image. For example, the image analysis module can identify one or more image keywords based on the image and the identified one or more patterns.

The data processing system can generate an action data structure based on the one or more image keywords. For example, the data processing system can identify a trigger keyword among the one or more image keywords. The trigger keyword can include, for example, "to go to" or "ride" or variations of these terms. The trigger keyword can indicate a type of service or product. The data processing system can identify a request based on the image keyword, or based on an input audio signal accompanying the image. The request can be determined based on the terms "I need" in an input audio signal, which can accompany an image of a product, such as an image of laundry detergent. The trigger keyword and request can be determined using a semantic processing technique, natural language processing technique, or image processing technique.

The data processing system generating an action data structure. The data processing system can generate the action data structure based on the one or more image keywords, trigger keyword, request, third party provider device, or other information. The action data structure can be responsive to the request. For example, if the end user of the client computing device requests a taxi from Taxi Service Company A, the action data structure can include information to request a taxi service from Taxi Service Company A. The data processing system can select a template for Taxi Service Company A, and populate fields in the template with values to allow the Taxi Service Company A to send a taxi to the user of the client computing device to pick up the user and transport the user to the requested destination.

In another example, the image keywords can correspond to a product, such as laundry detergent. The data processing system can determine that the trigger keyword or request corresponds to a request to purchase the laundry detergent. The action data structure can be responsive to this request. For example, the action data structure can include information to order the laundry detergent from third party provider. The information can include the brand of laundry detergent, quantity of the laundry detergent, delivery address, account information, payment information, time of request, or shipment method.

To generate the action data structure, the data processing system can select, from a database stored in memory, a template based on the one or more image keywords. For example, the one or more image keywords can correspond to or include one or more trigger keywords, and the data processing system can select the template based on the trigger keyword associated with the image keyword. The data processing system can generate the action data structure based on the template.

The data processing system can identifying a third party provider based on the one or more image keywords. For example, the image keyword can include or correspond to a trigger keyword, and the data processing system can identify the third party provider based on the trigger keyword. In another example, the image can be associated with an input audio signal, the data processing system can determine trigger keywords from the input audio signal or the image, and identify the third party provider based on the trigger keyword. The data processing system can select a template based on the third party provider, and generate an action data structure based on the template for the third party provider.

Upon selecting the template, the data processing system can identify a field in the template. The data processing system can receive a value from the computing device corresponding to the field in the template. Values can include or indicate, for example, a type of service of product, quantity of a product, location information, or payment information. The data processing system can populate the field in the template with the value received from the computing device to generate the action data structure.

The data processing system can transmit the action data structure to a third party provider device to cause the third party provider device to perform an action (e.g., deliver the laundry detergent). The third party device can parse or process the received action data structure and determine to invoke a conversational API and establish a communication session between the third party provider device and the client device. The service provider device can determine to invoke or otherwise execute or utilize the conversational API based on the contents of the action data structure. For example, the service provider device can determine that additional information can facilitate performing an operation corresponding to the action data structure. The service provider device can determine that communicating with the client computing device can improve a level of service or reduce resource utilization due to erroneous performance of the operation. The service provider device can determine to customize the operation for the client computing device by obtaining additional information.

In some cases, the data processing system can transmit the action data structure to a third party provider device to cause the third party provider device to invoke a conversational application programming interface and establish a communication session between the third party provider device and the computing device. The data processing system can route data packets between the client computing device and the third party provider device to establish the communication session. The data processing system can receive, from the third party provider device, an indication that the third party provider device established the communication session with the computing device. The indication can include a timestamp corresponding to when the communication session was established, a unique identifier of the communication session (e.g., a tuple formed of the device identifier, time and date stamp of the communication session, and identifier of the service provider device).

At ACT 720, the data processing system can select a content item. The data processing system can select, based on a comparison of the one or more image keywords with one or more keywords of each of a plurality of content items, a content item. The data processing system can select the content item based on a real-time content selection process. The data processing system can use the one or more image keywords to select the content item via a real-time content selection process. The content item can be provided by a content provider different from a third party provider device. The content item can correspond to a type of service different from a type of service of an action data structure. In some cases, the content item can include an action data structure.

At ACT 725, the data processing system can provide the content item. The data processing system can provide the content item to the computing device to cause the computing device to present the content item. For example, the content item can include audio, in which case the computing device can play the audio via a speaker connected to or integrated with the computing device.

For example, the data processing system can receive data corresponding to an image. The image can be of tickets to a movie. The data processing system can analyze the image to determine that the image corresponds to a particular movie that is playing at a particular theater. The data processing system can further identify a time the movie is being played. The data processing system can generate one or more image keywords for the image of the movie ticket using an image analysis module. The data processing system can use the image keywords to generate an action data structure. For example, the data processing system can generate an action data structure corresponding to a ride sharing service. The data processing system can provide a content item corresponding to the ride sharing service, or transmit the action data structure to a provider of the ride sharing service in order to cause the provider to perform an action such as invoking the ride service.

The data processing system can generate the action data structure using a template. The data processing system can select a template to use to generate the action data structure based on keywords, such as the one or more image keywords. The data processing system can determine a type of action based on the one or more image keywords, and then select a template from a template repository stored in a data repository. The data processing system can use the image analysis module to determine the type of action. The data processing system can use the one or more image keywords to determine the type of action. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system for image recognition-based content selection, comprising:
   a data processing system including one or more processors and memory to execute instructions, the data processing system to:
   receive a request for content from a computing device connected to a network;
   receive, via an application executed by the computing device connected to the network, an image captured by a camera of the computing device;
   analyze the image to identify a pattern that matches an object stored in an image pattern database comprising a plurality of patterns of objects;
   determine, based on a setting established for the computing device that prevents keyword identification for images that are uploaded to a private album, that keyword identification is authorized for the object in the image;
   identify, responsive to the determination that keyword identification is authorized for the object, a plurality of keywords associated with the object stored in the image pattern database, the plurality of keywords previously derived for the object using one or more techniques;

select, based on a comparison of the plurality of keywords derived for the object in the image with historical logs indicating performance of the plurality of keywords for the object in the image, one or more image keywords of the plurality of keywords of the object for association with the image received via the camera of the computing device;

determine a timestamp associated with selection of the one or more image keywords for association with the image received via the camera of the computing device;

select, via a real-time content selection process including a comparison of the one or more image keywords with one or more keywords of each of a plurality of content items, a content item having a highest score based on the comparison and an age of the one or more image keywords indicated by the timestamp; and provide, to the computing device responsive to receipt of the request and the image captured by the camera of the computing device, the content item to cause the computing device to present the content item.

2. The system of claim 1, comprising the data processing system to:

identify a trigger keyword and a request for a service or a product provided by a third party provider device;

generate, responsive to the request for the service or the product, an action data structure based on the trigger keyword, the action data structure configured to fulfill the request.

3. The system of claim 1, comprising the data processing system to:

identify a request for a service or a product provided by a third party provider device;

generate, responsive to the request for the service or the product, an action data structure based on a trigger keyword, the action data structure configured to fulfill the request; and transmit the action data structure to the third party provider device to cause the third party provider device to perform an action.

4. The system of claim 1, comprising the data processing system to:

identify a trigger keyword and a request for a service or a product provided by a third party provider device;

generate, responsive to the request for the service or the product, an action data structure based on the trigger keyword, the action data structure configured to fulfill the request; and transmit the action data structure to the third party provider device to cause the third party provider device to invoke a conversational application programming interface and establish a communication session between the third party provider device and the computing device.

5. The system of claim 1, comprising the data processing system to:

identify a request for a service or a product provided by a third party provider device;

generate, responsive to the request for the service or the product, an action data structure based on a trigger keyword, the action data structure configured to fulfill the request;

transmit the action data structure to the third party provider device to cause the third party provider device to perform an action to invoke a conversational application programming interface and establish a communication session between the third party provider device and the computing device; and receive, from the third party provider device, an indication that the third party provider device established the communication session with the computing device.

6. The system of claim 1, comprising the data processing system to:

identify a trigger keyword and a request for a service or a product provided by a third party provider device;

select, from a database stored in memory, a template based on the trigger keyword; and generate, responsive to the request for the service or the product, an action data structure based on the template, the action data structure configured to fulfill the request.

7. The system of claim 1, comprising the data processing system to:

identify a trigger keyword;

identify a third party provider based on the trigger keyword;

select, from a database stored in memory, a template based on the third party provider;

identify a request for a service or product provided by the third party provider; and generate, responsive to the request, an action data structure based on the template for the third party provider, the action data structure configured to fulfill the request.

8. The system of claim 1, comprising the data processing system to:

identify a request for a service or product provided by a third party provider;

select, from a database stored in memory, a template based on a trigger keyword associated with the request;

identify a field in the template;

receive a value from the computing device corresponding to the field in the template; and populate, responsive to the request for the service or the product, the field in the template with the value received from the computing device to generate an action data structure configured to fulfill the request.

9. The system of claim 1, comprising the data processing system to:

identify a trigger keyword and a request for a service or product provided by a third party provider device;

generate, responsive to the request for the service or the product, an action data structure based on the trigger keyword, the action data structure configured to fulfill the request; and transmit the action data structure to the third party provider device to cause the third party provider device to invoke a conversational application programming interface configured for the third party provider device and executed by the data processing system, wherein the data processing system routes data packets between the computing device and the third party provider device to establish a communication session.

10. The system of claim 9, comprising the data processing system to:

receive the one or more image keywords and select, based on the one or more image keywords, the content item via the real-time content selection process, the content item provided by a content provider different from the third party provider device, the content item corresponding to a type of service different from a type of service of the action data structure.

11. A method of selecting content based on image data, comprising:

receiving, by a data processing system having one or more processors, via an application executed by a computing device connected to a network, an image captured by a camera of the computing device;

receiving, by the data processing system, a request for content from the computing device;

analyzing, by the data processing system, the image to identify a pattern that matches an object stored in an image pattern database comprising a plurality of patterns of objects;

determining, by the data processing system, based on a setting established for the computing device that prevents keyword identification for images that are uploaded to a private album, that keyword identification is authorized for the object in the image;

identifying, by the data processing system, responsive to the determination that keyword identification is authorized for the object, a plurality of keywords associated with the object stored in the image pattern database, the plurality of keywords previously derived for the object using one or more techniques;

selecting, by the data processing system, based on a comparison of the plurality of keywords derived for the object in the image with historical logs indicating performance of the plurality of keywords for the object in the image, one or more image keywords of the plurality of keywords of the object for association with the image received via the camera of the computing device;

determining, by the data processing system, a timestamp associated with selection of the one or more image keywords for association with the image received via the camera of the computing device;

selecting, by the data processing system via a real-time content selection process including a comparison of the one or more image keywords with one or more keywords of each of a plurality of content items, a content item having a highest score based on the comparison and an age of the one or more image keywords indicated by the timestamp; and providing, by the data processing system to the computing device, responsive to receipt of the request and the image captured by the camera of the computing device, the content item to cause the computing device to present the content item.

12. The method of claim 11, comprising:
identifying a trigger keyword and a request for a service or a product provided by a third party provider device;
generating, responsive to the request for the service or the product, an action data structure based on the trigger keyword, the action data structure configured to fulfill the request.

13. The method of claim 11, comprising:
identifying a trigger keyword and a request for a service or a product provided by a third party provider device;
generating, responsive to the request for the service or the product, an action data structure based on the trigger keyword, the action data structure configured to fulfill the request; and
transmitting the action data structure to the third party provider device to cause the third party provider device to perform an action.

14. The method of claim 11, comprising:
identifying a request for a service or a product provided by a third party provider device;
generating, responsive to the request for the service or the product, an action data structure based on a trigger keyword, the action data structure configured to fulfill the request; and
transmitting the action data structure to the third party provider device to cause the third party provider device to invoke a conversational application programming interface and establish a communication session between the third party provider device and the computing device.

15. The method of claim 11, comprising:
identifying a trigger keyword for a service or a product provided by a third party provider device;
generating an action data structure based on the trigger keyword, the action data structure configured to fulfill the request;
transmitting the action data structure to the third party provider device to cause the third party provider device to perform an action to invoke a conversational application programming interface and establish a communication session between the third party provider device and the computing device; and
receiving, from the third party provider device, an indication that the third party provider device established the communication session with the computing device.

16. The method of claim 11, comprising:
identifying a request for a service or a product provided by a third party provider device;
selecting, from a database stored in memory, a template based on a trigger keyword associated with the request; and
generating, responsive to the request for the service or the product, an action data structure based on the template, the action data structure configured to fulfill the request.

17. The method of claim 11, comprising:
identifying a third party provider based on a trigger keyword;
selecting, from a database stored in memory, a template based on the third party provider;
identifying a request for a service or product provided by the third party provider; and
generating, responsive to the request for the service or the product, an action data structure based on the template for the third party provider, the action data structure configured to fulfill the request.

18. The method of claim 11, comprising:
identifying a trigger keyword and a request for a service or product provided by a third party provider;
selecting, from a database stored in memory, a template based on the trigger keyword;
identifying a field in the template;
receiving a value from the computing device corresponding to the field in the template; and
populating, responsive to the request for the service or the product, the field in the template with the value received from the computing device to generate an action data structure.

19. The method of claim 11, comprising:
identifying a trigger keyword;
generating an action data structure based on the trigger keyword; and
transmitting the action data structure to a third party provider device to cause the third party provider device to invoke a conversational application programming interface configured for the third party provider device and executed by the data processing system, wherein the data processing system routes data packets between the computing device and the third party provider device to establish a communication session.

20. The method of claim 19, comprising:

receiving the one or more image keywords and selecting, based on the one or more image keywords, the content item via the real-time content selection process, the content item provided by a content provider different from the third party provider device, the content item corresponding to a type of service different from a type of service of the action data structure.

\* \* \* \* \*